US012694273B2

(12) United States Patent
Qiu et al.

(10) Patent No.: US 12,694,273 B2
(45) Date of Patent: Jul. 28, 2026

(54) DATA ANALYSIS APPARATUS, DATA ANALYSIS METHOD, METHOD OF GENERATING TRAINED MODEL, SYSTEM, AND PROGRAM

(71) Applicant: SHIMADZU CORPORATION, Kyoto (JP)

(72) Inventors: Haodong Qiu, Kyoto (JP); Shiori Nagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 803 days.

(21) Appl. No.: 18/041,758

(22) PCT Filed: May 21, 2021

(86) PCT No.: PCT/JP2021/019425
§ 371 (c)(1),
(2) Date: May 31, 2023

(87) PCT Pub. No.: WO2022/038852
PCT Pub. Date: Feb. 24, 2022

(65) Prior Publication Data
US 2023/0351161 A1    Nov. 2, 2023

(30) Foreign Application Priority Data
Aug. 18, 2020    (JP) ................................. 2020-138104

(51) Int. Cl.
*G06F 17/00* (2019.01)
*G01N 21/35* (2014.01)
(Continued)

(52) U.S. Cl.
CPC ........... *G06N 3/0464* (2023.01); *G01N 21/35* (2013.01); *G01N 2021/3595* (2013.01)

(58) Field of Classification Search
CPC ................. G06N 3/0464; G01N 21/35; G01N 2021/3595
(Continued)

(56) References Cited

U.S. PATENT DOCUMENTS 12,038,374 B2 *  7/2024  Lu ........................... G01N 21/35
12,106,543 B2 *  10/2024  Liu ........................ G06V 10/58
(Continued)

FOREIGN PATENT DOCUMENTS

CN    106124449 A    11/2016
CN    106290240 A    1/2017
(Continued)

OTHER PUBLICATIONS

Office Action issued Nov. 7, 2023 in Japanese Application No. 2022-543285.
(Continued)

*Primary Examiner* — Pavan Mamillapalli
(74) *Attorney, Agent, or Firm* — Sughrue Mion, PLLC

(57) ABSTRACT

A data analysis apparatus, a data analysis method, a method of generating a trained model, a system, and a program that allow highly accurate and easy analysis of an FT-IR spectrum are provided. The data analysis apparatus includes an obtaining unit that obtains an analysis target which is an FT-IR spectrum, a trained model, and an analyzer that inputs the analysis target to the trained model. The trained model is machine-trained so as to output, when the trained model receives input of an FT-IR spectrum, information indicating whether or not the inputted FT-IR spectrum includes a peak derived from a trained atomic group. The trained atomic group includes an atomic group containing at least three atoms.

10 Claims, 18 Drawing Sheets

(51) Int. Cl.
  G06F 7/00      (2006.01)
  G06N 3/0464    (2023.01)
(58) Field of Classification Search
  USPC ......................................................... 706/20
  See application file for complete search history.

(56)              References Cited

U.S. PATENT DOCUMENTS

| | | | | |
|---|---|---|---|---|
| 2007/0298508 | A1* | 12/2007 | DesLauriers | ...... G01N 21/3563 |
| | | | | 436/85 |
| 2018/0268293 | A1 | 9/2018 | Noda | |
| 2020/0149998 | A1* | 5/2020 | Ayyagari | ............... G06N 3/088 |
| 2021/0055211 | A1 | 2/2021 | Nagamori et al. | |

FOREIGN PATENT DOCUMENTS

| | | | |
|---|---|---|---|
| CN | 106706546 | A | 5/2017 |
| CN | 108629365 | A | 10/2018 |
| CN | 111033230 | A | 4/2020 |
| JP | 6-50890 | A | 2/1994 |
| JP | 2019-039773 | A | 3/2019 |
| JP | 2020-106340 | A | 7/2020 |
| WO | 2018/193499 | A1 | 10/2018 |

OTHER PUBLICATIONS

Communication issued Jul. 19, 2025 in Chinese Application No. 202180050700.X.

Kazutoshi Tanabe et al., "Structure estimation from infrared spectra by computer", Journal of Computer Chemistry, Mar. 15, 2005, p. 1-24, vol. 4, No. 1.

International Search Report for PCT/JP2021/019425 dated, Aug. 10, 2021 (PCT/ISA/210).

Written Opinion of the International Searching Authority PCT/JP2021/019425 dated, Aug. 10, 2021 (PCT/ISA/210).

\* cited by examiner

FIG.7

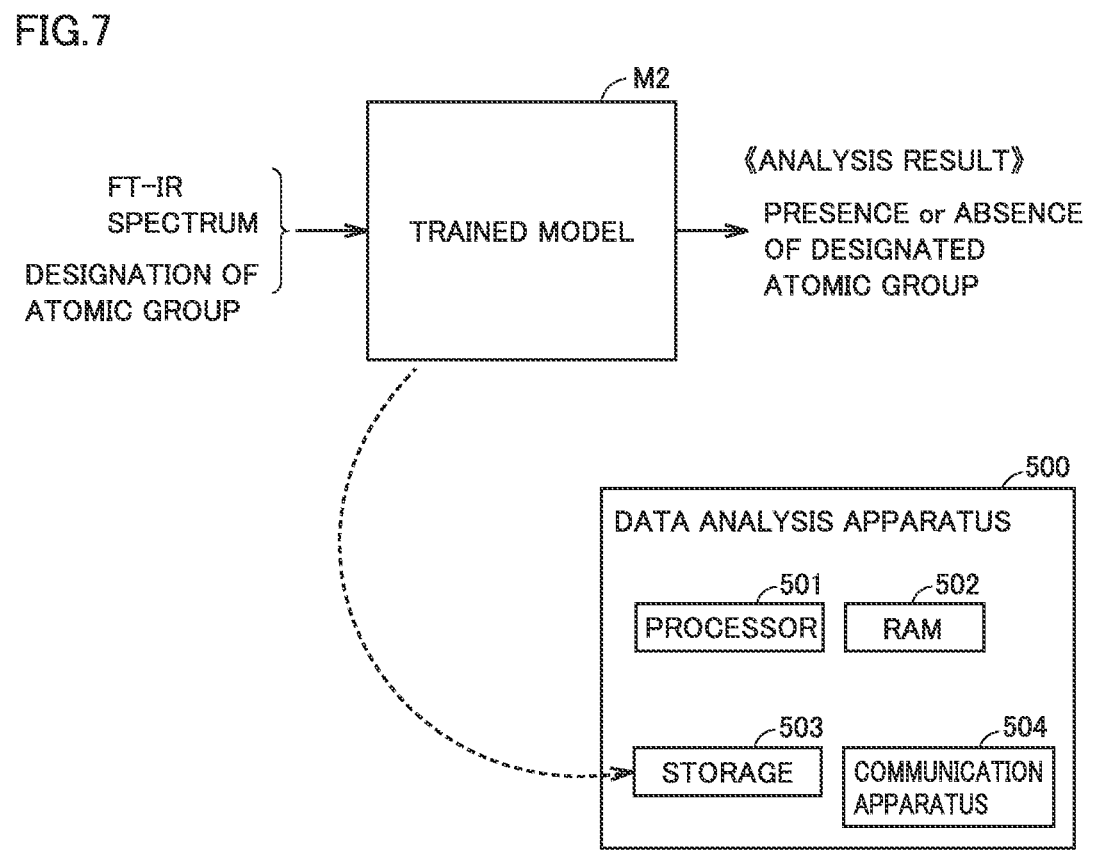

FT-IR
SPECTRUM

DESIGNATION OF
ATOMIC GROUP

M2

TRAINED MODEL

《ANALYSIS RESULT》

PRESENCE or ABSENCE
OF DESIGNATED
ATOMIC GROUP

500

DATA ANALYSIS APPARATUS

501
PROCESSOR

502
RAM

503
STORAGE

504
COMMUNICATION
APPARATUS

FIG.8

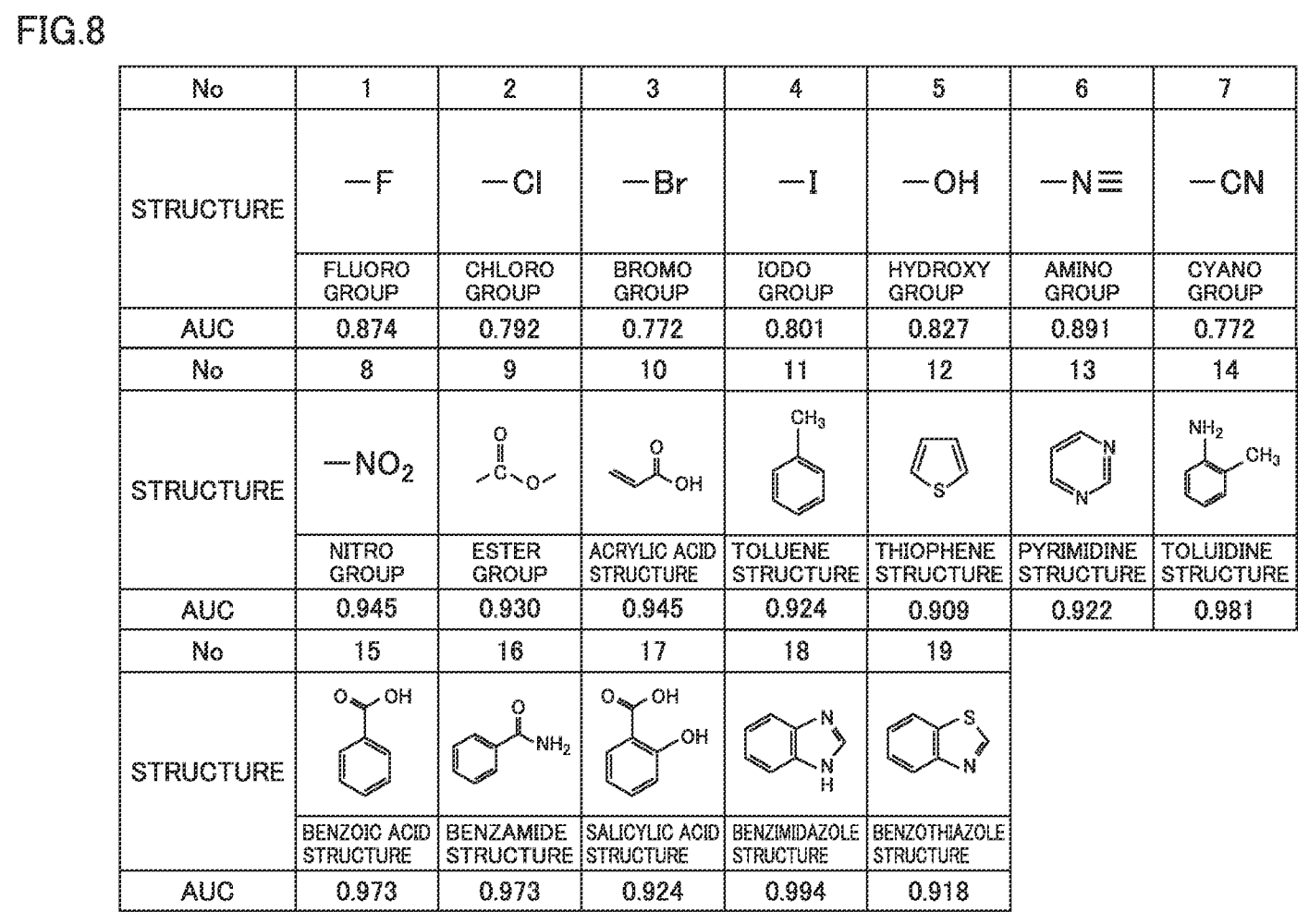

| No | 1 | 2 | 3 | 4 | 5 | 6 | 7 |
|---|---|---|---|---|---|---|---|
| STRUCTURE | —F | —Cl | —Br | —I | —OH | —N≡ | —CN |
| | FLUORO GROUP | CHLORO GROUP | BROMO GROUP | IODO GROUP | HYDROXY GROUP | AMINO GROUP | CYANO GROUP |
| AUC | 0.874 | 0.792 | 0.772 | 0.801 | 0.827 | 0.891 | 0.772 |
| No | 8 | 9 | 10 | 11 | 12 | 13 | 14 |
| STRUCTURE | —NO₂ | (ester) | (acrylic acid) | (toluene CH₃) | (thiophene) | (pyrimidine) | (toluidine) |
| | NITRO GROUP | ESTER GROUP | ACRYLIC ACID STRUCTURE | TOLUENE STRUCTURE | THIOPHENE STRUCTURE | PYRIMIDINE STRUCTURE | TOLUIDINE STRUCTURE |
| AUC | 0.945 | 0.930 | 0.945 | 0.924 | 0.909 | 0.922 | 0.981 |
| No | 15 | 16 | 17 | 18 | 19 | | |
| STRUCTURE | (benzoic acid) | (benzamide) | (salicylic acid) | (benzimidazole) | (benzothiazole) | | |
| | BENZOIC ACID STRUCTURE | BENZAMIDE STRUCTURE | SALICYLIC ACID STRUCTURE | BENZIMIDAZOLE STRUCTURE | BENZOTHIAZOLE STRUCTURE | | |
| AUC | 0.973 | 0.973 | 0.924 | 0.994 | 0.918 | | |

Figure 18:
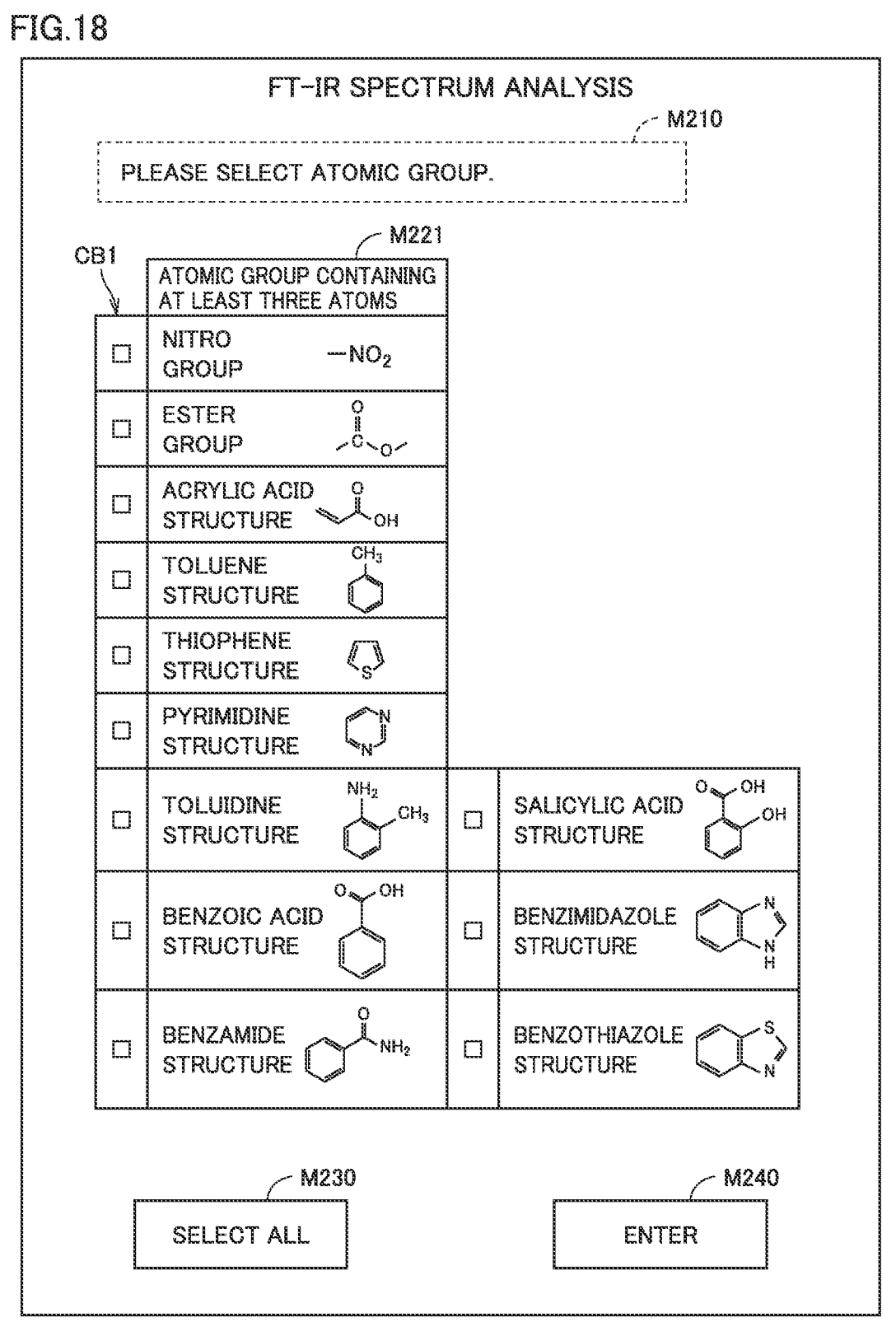

FT-IR SPECTRUM ANALYSIS

M210

PLEASE SELECT ATOMIC GROUP.

M221

CB1

| | ATOMIC GROUP CONTAINING AT LEAST THREE ATOMS | | |
|---|---|---|---|
| ☐ | NITRO GROUP —NO$_2$ | | |
| ☐ | ESTER GROUP | | |
| ☐ | ACRYLIC ACID STRUCTURE | | |
| ☐ | TOLUENE STRUCTURE | | |
| ☐ | THIOPHENE STRUCTURE | | |
| ☐ | PYRIMIDINE STRUCTURE | | |
| ☐ | TOLUIDINE STRUCTURE | ☐ | SALICYLIC ACID STRUCTURE |
| ☐ | BENZOIC ACID STRUCTURE | ☐ | BENZIMIDAZOLE STRUCTURE |
| ☐ | BENZAMIDE STRUCTURE | ☐ | BENZOTHIAZOLE STRUCTURE |

M230

SELECT ALL

M240

ENTER

DATA ANALYSIS APPARATUS, DATA ANALYSIS METHOD, METHOD OF GENERATING TRAINED MODEL, SYSTEM, AND PROGRAM

CROSS REFERENCE TO RELATED APPLICATIONS

This application is a National Stage of International Application No. PCT/JP2021/019425 filed May 21, 2021, claiming priority based on Japanese Patent Application No. 2020-138104 filed Aug. 18, 2020.

TECHNICAL FIELD

The present disclosure relates to a data analysis apparatus, a data analysis method, a method of generating a trained model, a system, and a program.

BACKGROUND ART

A Fourier transform infrared spectrophotometer (which is also referred to as an "FT-IR photometer" below) emits infrared coherent light to a sample and detects reflected light or transmissive light. The FT-IR photometer subjects a graph (interferogram) of records of detection signals to Fourier transform to thereby obtain a spectrum (which is also referred to as an "FT-IR spectrum" below) in which the abscissa represents a wavelength or a wave number and the ordinate represents intensity (for example, an absorbance or a transmittance). Since the FT-IR spectrum exhibits a pattern in accordance with a molecular structure of a sample, a user can conduct qualitative analysis with the use of the FT-IR spectrum. Since the intensity represented on the ordinate of the FT-IR spectrum is approximately in proportion to a concentration or a thickness of the sample, the user can conduct quantitative analysis based on a height or an area of a peak in the FT-IR spectrum. WO2018/193499 (PTL 1) discloses an exemplary FT-IR photometer.

CITATION LIST

Patent Literature

PTL 1: WO2018/193499

SUMMARY OF INVENTION

Technical Problem

The user can conduct the qualitative analysis and/or the quantitative analysis described above by analyzing the FT-IR spectrum. In general, a library (for example, a database showing a spectrum pattern for each compound or atomic group) is used for analysis of the FT-IR spectrum. While the user visually observes an FT-IR spectrum and compares the FT-IR spectrum with a spectrum pattern shown in the library, the user analyzes the FT-IR spectrum. Analysis of the FT-IR spectrum, however, is not necessarily easy for a user unfamiliar with such analysis. In addition, since the FT-IR spectrum of a compound complicated in structure exhibits a complicated spectrum pattern, it is difficult even for an experienced and knowledgeable user to conduct accurate analysis.

The present disclosure was made to solve the problem above, and an object of the present disclosure is to provide a data analysis apparatus, a data analysis method, a method of generating a trained model, a system, and a program that allow highly accurate and easy analysis of an FT-IR spectrum.

Solution to Problem

A data analysis apparatus according to a first aspect of the present disclosure includes an obtaining unit that obtains an analysis target which is an FT-IR spectrum, a trained model, and an analyzer that provides the analysis target to the trained model. The trained model is machine-trained to output, when the trained model receives input of an FT-IR spectrum, information indicating whether the inputted FT-IR spectrum includes a peak derived from a trained atomic group. The trained atomic group includes an atomic group containing at least three atoms.

A data analysis method according to a second aspect of the present disclosure includes an obtaining step and an input step which will be described below.

In the obtaining step, an FT-IR spectrum of a compound having an unknown molecular structure is obtained. In the input step, the FT-IR spectrum obtained in the obtaining step and designation information that designates one atomic group composed of at least three atoms are inputted to a trained model. The trained model is a mathematical model machine-trained to output, when the trained model receives input of an FT-IR spectrum and the designation information, information indicating whether the inputted FT-IR spectrum includes a peak derived from an atomic group containing at least three atoms designated by the inputted designation information.

A method of generating a trained model according to a third aspect of the present disclosure includes an analysis step, a storage step, and a training step which will be described below.

In the analysis step, a compound having an already known molecular structure is analyzed with a Fourier transform infrared spectrophotometer to obtain an FT-IR spectrum. In the storage step, the FT-IR spectrum obtained in the analysis step and atomic group information of the compound analyzed in the analysis step are stored in association with each other. In the training step, machine learning for generating a trained model capable of analyzing whether an FT-IR spectrum includes a peak derived from a prescribed atomic group is carried out, with the FT-IR spectrum and the atomic group information stored in the storage step being used as training data. The prescribed atomic group includes an atomic group containing at least three atoms. The atomic group information of a compound including the prescribed atomic group indicates the prescribed atomic group included in the compound. The atomic group information of a compound not including the prescribed atomic group indicates that the compound does not include the prescribed atomic group.

A system according to a fourth aspect of the present disclosure is a system including at least one computer that performs the data analysis method or the method of generating a trained model described above.

A program according to a fifth aspect of the present disclosure is a program that causes a computer to perform the data analysis method or the method of generating a trained model described above.

Advantageous Effects of Invention

The inventors of the present application have successfully generated a trained model capable of highly accurately analyzing whether or not an FT-IR spectrum (an analysis target provided to the trained model) includes a peak derived from a trained atomic group (an atomic group containing at least three atoms), by machine learning in connection with the atomic group containing at least three atoms. The FT-IR spectrum of a compound including the atomic group containing at least three atoms tends to exhibit a complicated spectrum pattern. With the data analysis apparatus and the data analysis method described above, however, such an FT-IR spectrum can highly accurately and readily be analyzed with the use of the trained model as above. According to the method of generating a trained model described above, the trained model as above can suitably be generated.

BRIEF DESCRIPTION OF DRAWINGS

FIG. 7 is a diagram for illustrating a trained model incorporated in a data analysis apparatus according to the embodiment of the present disclosure.

FIG. 8 is a diagram showing an average AUC of each trained atomic group of the trained model shown in FIG. 7.

FIG. 16 is a diagram showing an exemplary screen for receiving input of an atomic group in the processing shown in FIG. 14.

FIG. 18 is a diagram showing a modification of the screen shown in FIG. 16.

DESCRIPTION OF EMBODIMENTS

Figure 1:
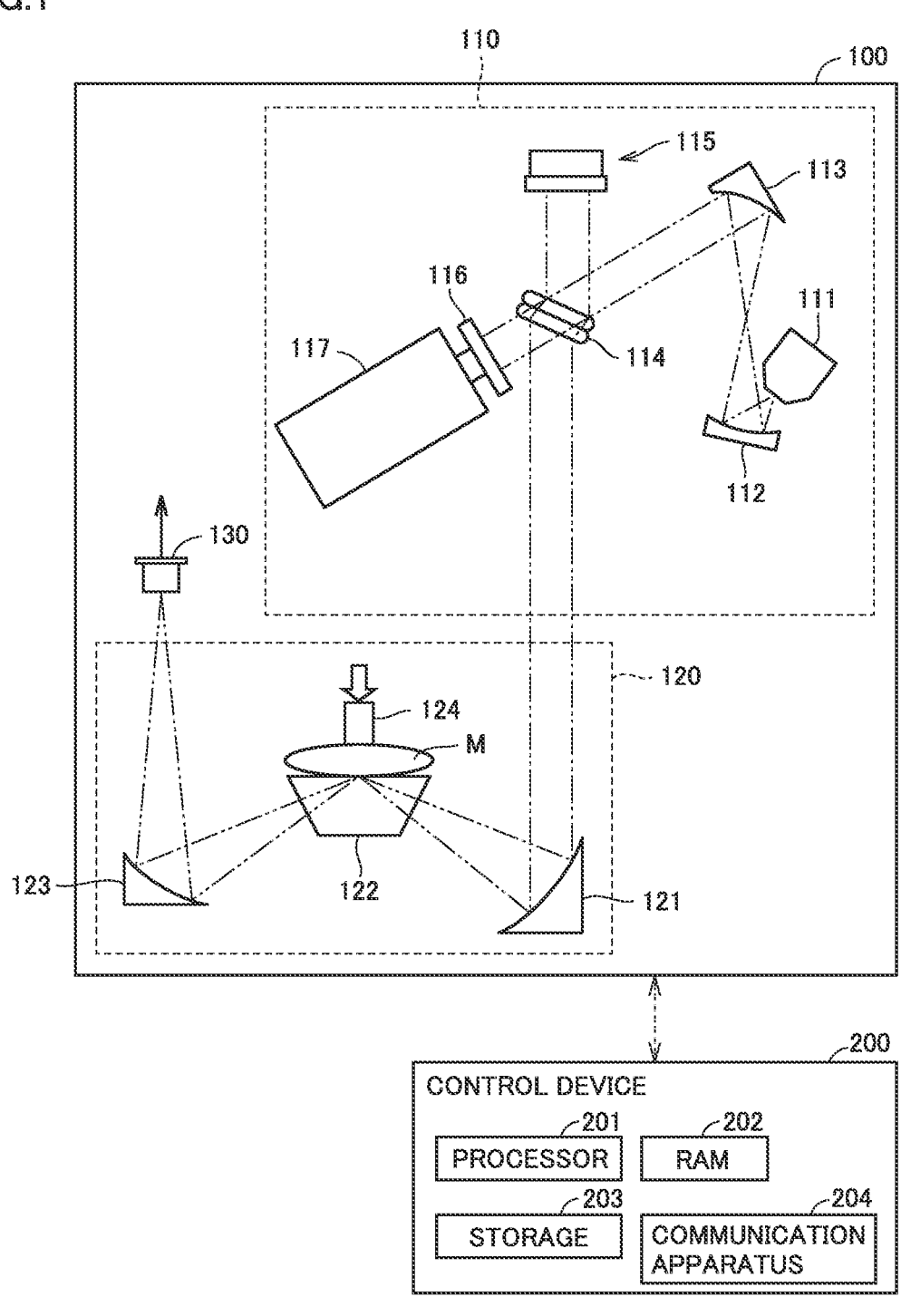
FIG. 1 is a diagram showing a configuration of a Fourier transform infrared spectrophotometer according to an embodiment of the present disclosure.

An embodiment of the present disclosure will be described in detail below with reference to the drawings.

The same or corresponding elements in the drawings have the same reference characters allotted and description thereof will not be repeated.

FIG. 1 is a diagram showing a configuration of a Fourier transform infrared spectrophotometer (FT-IR photometer) according to this embodiment.

Referring to FIG. 1, an FT-IR photometer according to this embodiment includes an analysis apparatus 100 and a control device 200 that controls analysis apparatus 100. Analysis apparatus 100 includes an interference wave generator 110, an emitter 120, and a detector 130. Interference wave generator 110 generates infrared coherent light. Emitter 120 irradiates a sample M with infrared coherent light generated in interference wave generator 110. Infrared coherent light is reflected by sample M. Infrared coherent light reflected by sample M goes out of emitter 120 to detector 130. Detector 130 detects infrared coherent light incoming from emitter 120.

Interference wave generator 110 includes a light source 111, a light concentration mirror 112, a collimator mirror 113, a beam splitter 114, a fixed mirror 115, a movable mirror 116, and a mirror actuator 117. Emitter 120 includes a light concentration mirror 121, a prism 122, a light concentration mirror 123, and a pressing mechanism 124. Various actuators included in interference wave generator 110 and emitter 120 are controlled by control device 200.

Light source 111 is configured to emit infrared light. For example, at least one of a ceramic light source and a tungsten lamp can be adopted as light source 111. FIG. 1 shows an optical path of infrared light with a chain double-dotted line.

Infrared light emitted from light source 111 is reflected by light concentration mirror 112 and collimator mirror 113 to become parallel light, and is incident on beam splitter 114. In beam splitter 114, some of infrared light is reflected toward fixed mirror 115. Remaining infrared light passes through beam splitter 114 and travels to movable mirror 116. Infrared light reflected by each of fixed mirror 115 and movable mirror 116 is incident on beam splitter 114 and combined.

Movable mirror 116 is configured to be movable in a direction of an optical axis. Movable mirror 116 moves in the direction of the optical axis by being driven by mirror actuator 117. Control device 200 controls a reflection surface of movable mirror 116 by controlling mirror actuator 117 to move movable mirror 116. Collimator mirror 113, beam splitter 114, fixed mirror 115, movable mirror 116, and mirror actuator 117 constitute a Michelson interferometer. This Michelson interferometer is configured to generate infrared coherent light with infrared light emitted from light source 111. Infrared coherent light generated by the Michelson interferometer is emitted from beam splitter 114 to emitter 120.

The FT-IR photometer according to this embodiment measures an FT-IR spectrum of sample M with attenuated total reflection (ATR). As sample M is brought in contact with prism 122 and sample M is irradiated with infrared light through prism 122, infrared light that passes through prism 122 is totally reflected at an interface between sample M and prism 122. Since infrared light penetrates slightly into sample M at the time of this total reflection, the FT-IR spectrum at the surface of sample M can be obtained by detection of total reflection light. For example, a diamond prism can be adopted as prism 122. Without being limited as such, a Ge prism or a ZnSe prism may be adopted instead of the diamond prism. Pressing mechanism 124 is configured to fix sample M while pressing sample M against the surface of prism 122.

Infrared coherent light incident on emitter 120 from interference wave generator 110 is reflected by light concentration mirror 121 and concentrated to prism 122. Infrared coherent light incident on prism 122 passes through prism 122 and is totally reflected at the interface between sample M and prism 122, and thereafter it is reflected by light concentration mirror 123 and incident on detector 130.

Detector 130 is an infrared detector, and configured to output a detection signal in accordance with infrared coherent light incident from emitter 120. For example, at least one of a deuterated L-alanine doped triglycine sulfate (DLATGS) detector, an MCT (HgCdTe) detector, and an InGaAs detector can be adopted as detector 130. Detector 130 may include a temperature adjustment mechanism. Detector 130 outputs the detection signal to control device 200.

In this embodiment, a computer including a processor 201, a random access memory (RAM) 202, a storage 203, and a communication apparatus 204 is adopted as control device 200. Any communication method may be adopted for communication apparatus 204, and any of wireless communication and wired communication may be applicable. For example, a central processing unit (CPU) can be adopted as processor 201. Control device 200 may include any number of processors, and may include a single processor or a plurality of processors. RAM 202 functions as a work memory where data processed by processor 201 is temporarily stored. Storage 203 is configured such that provided information can be stored therein. Not only a program but also information (for example, a map, a mathematical expression, and various parameters) used by the program is stored in storage 203.

Control device 200 subjects a detection signal inputted from detector 130 to analog/digital (A/D) conversion, and records the detection signal converted to the digital signal in storage 203. An interferogram is thus recorded in storage 203 of control device 200. Control device 200 splits a combined waveform spectrum of interference waves shown in the interferogram into optical intensity of each wave number component by Fourier transform to obtain the FT-IR spectrum. In this embodiment, an FT-IR spectrum in which the abscissa represents a wave number and the ordinate represents an absorbance is adopted. A detailed function of control device 200 will be described later (see FIG. 4).

Figure 2:
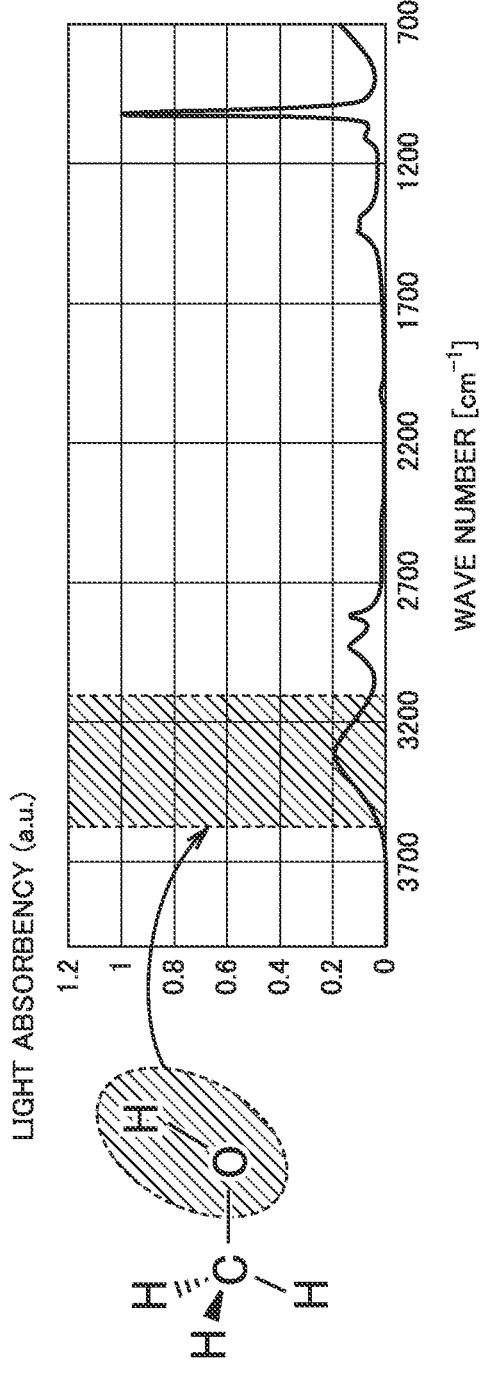
FIG. 2 is a diagram showing an exemplary FT-IR spectrum.

As set forth above, the FT-IR photometer according to this embodiment can analyze sample M to obtain the FT-IR spectrum of sample M. Sample M may be a compound having an unknown molecular structure. FIG. 2 is a diagram showing an exemplary FT-IR spectrum. The FT-IR spectrum shown in FIG. 2 is an FT-IR spectrum of methanol and includes a peak derived from a hydroxy group (—OH). Referring to FIG. 2, in the FT-IR spectrum, the peak derived from the hydroxy group appears in a region of wave numbers from 3200 to 3600 cm$^{-1}$. Infrared absorption indicated by the peak that appears in this region is infrared absorption specific to the hydroxy group.

Depending on an atomic group contained in a compound (that is, a partial structure of a compound), a position, intensity, and a width of a peak that appears in the FT-IR spectrum of that compound are varied. A user can know an atomic group contained in the compound by analyzing the FT-IR spectrum of the compound. A library (for example, a database showing a spectrum pattern for each compound or atomic group) can be used for analysis of the FT-IR spectrum. The user can analyze the FT-IR spectrum by visually observing the FT-IR spectrum and comparing the FT-IR spectrum with a spectrum pattern shown in the library.

Figure 3:
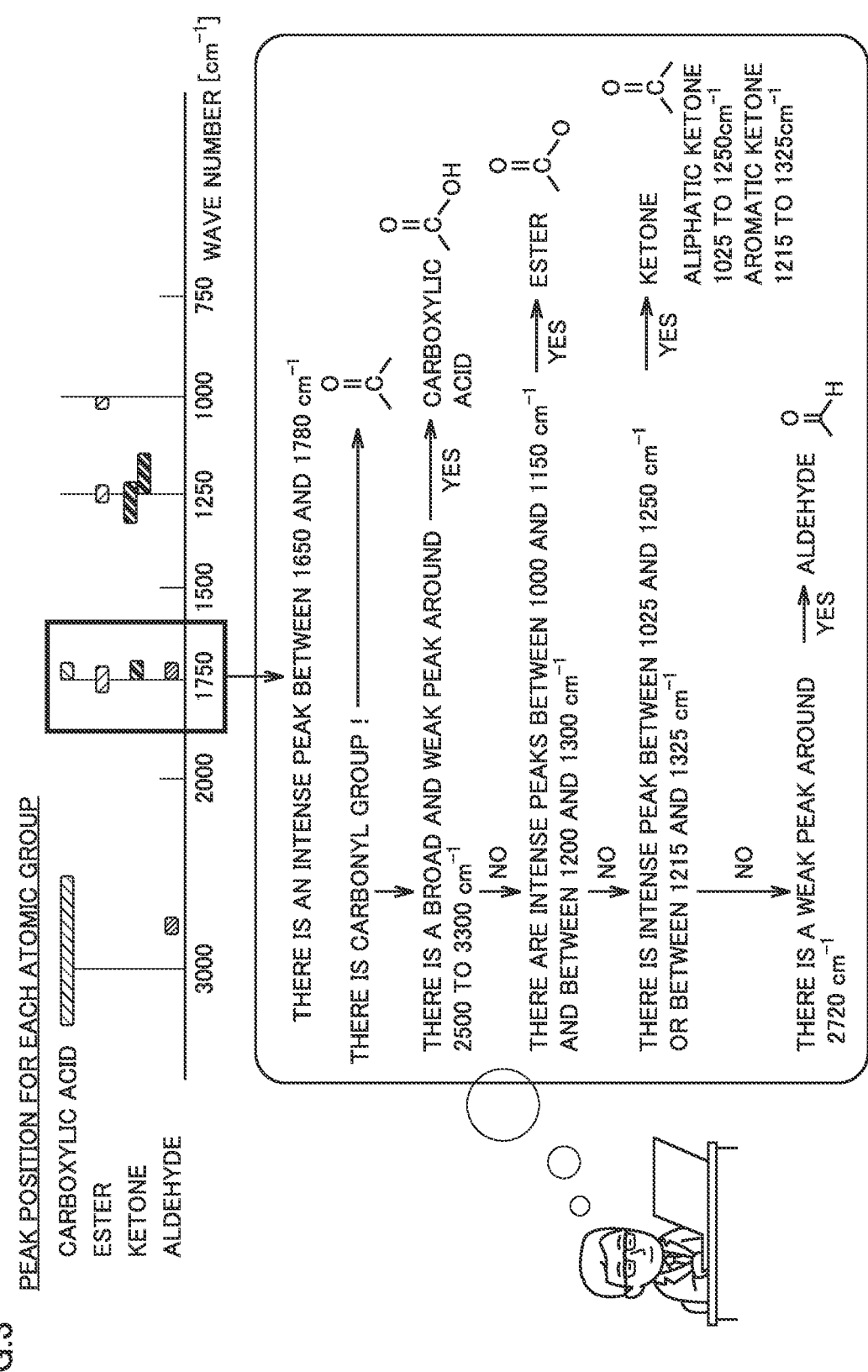
FIG. 3 is a diagram for illustrating an exemplary method of analysis of an FT-IR spectrum on a rule basis by a user.

FIG. 3 is a diagram for illustrating an exemplary method of analysis of an FT-IR spectrum on a rule basis by a user. Referring to FIG. 3, when the FT-IR spectrum includes an intense peak (which is also referred to as a "C═O peak" below) in a region of wave numbers from 1650 to 1780 cm$^{-1}$, presence of a carbonyl group is estimated. When the FT-IR spectrum further includes a broad and weak peak around wave numbers from 2500 to 3300 cm$^{-1}$ in addition to the C═O peak, the carbonyl group is estimated as C═O of carboxylic acid. When the FT-IR spectrum further includes an intense peak in a region of wave numbers from 1000 to 1150 cm$^{-1}$ and in a region of wave numbers from 1200 to 1300 cm$^{-1}$ in addition to the C═O peak, the carbonyl group is estimated as C═O of ester. When the FT-IR spectrum further includes an intense peak in a region of wave numbers from 1025 to 1250 cm$^{-1}$ in addition to the C═O peak, the carbonyl group is estimated as C═O of aliphatic ketone. When the FT-IR spectrum further includes an intense peak in a region of wave numbers from 1215 to 1325 cm$^{-1}$ in addition to the C═O peak, the carbonyl group is estimated as C═O of aromatic ketone. When the FT-IR spectrum further includes a weak peak around a wave number of 2720 cm$^{-1}$ in addition to the C═O peak, the carbonyl group is estimated as C═O of aldehyde.

With the method as above as well, the FT-IR spectrum can be analyzed. Analysis of the FT-IR spectrum with the method as above, however, is not necessarily easy for a user unfamiliar with such analysis. Since the FT-IR spectrum of a compound complicated in structure exhibits a complicated spectrum pattern, it is difficult even for an experienced and knowledgeable user to conduct accurate analysis.

In a data analysis method according to this embodiment, a data analysis apparatus incorporating a trained model is used to analyze an FT-IR spectrum to allow highly accurate and easy analysis of the FT-IR spectrum. The trained model is a mathematical model machine-trained to output, when it receives input of the FT-IR spectrum, information indicating whether or not the inputted FT-IR spectrum includes a peak derived from a trained atomic group. The inventors of the present application have successfully generated a trained model capable of highly accurately analyzing whether or not an FT-IR spectrum (an analysis target provided to the trained model) includes a peak derived from a trained atomic group (an atomic group containing at least three atoms), by machine learning in connection with the atomic group containing at least three atoms. A method of generating the trained model will be described below.

Figure 4:
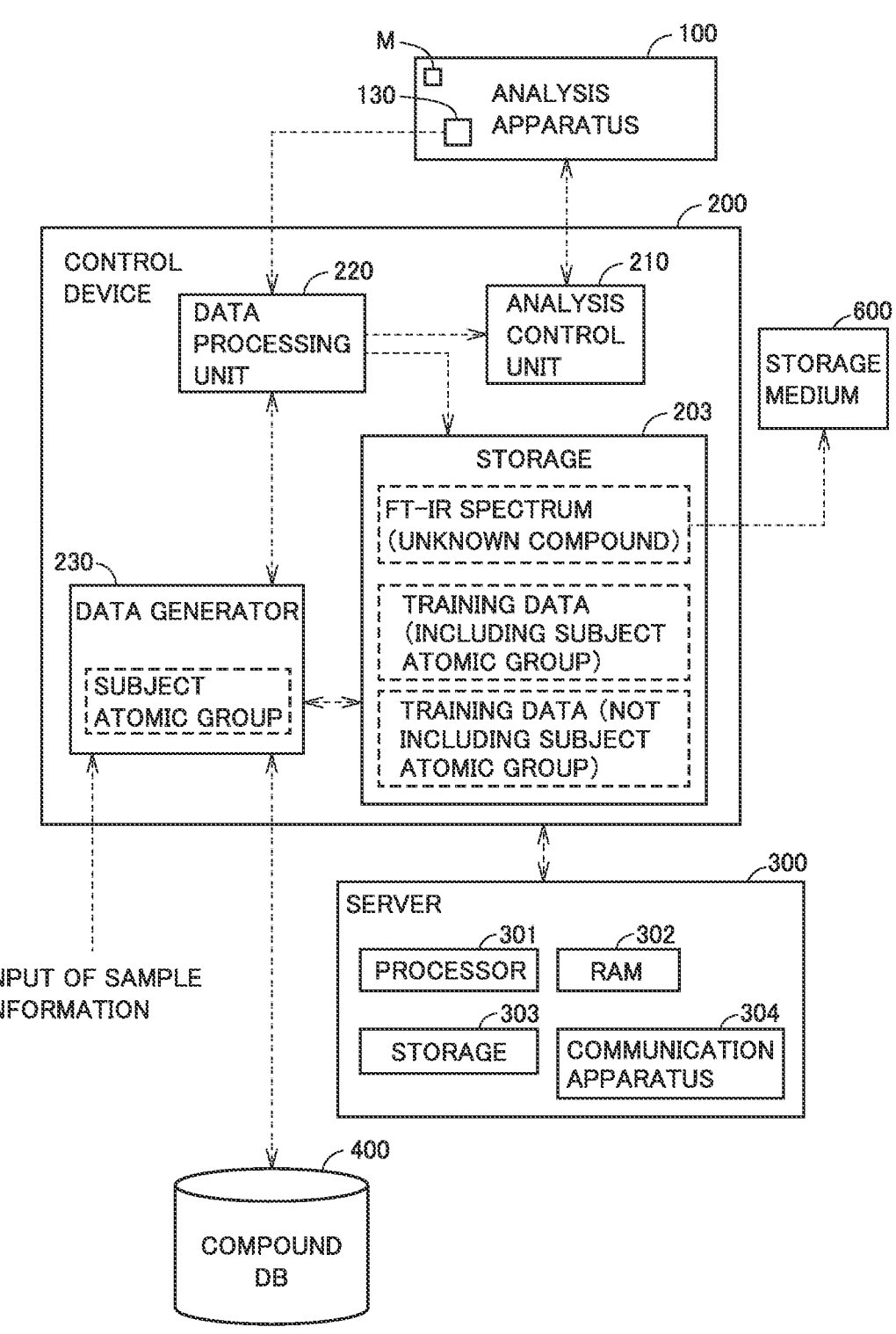
FIG. 4 is a diagram showing a detailed configuration of a control device shown in FIG. 1.

FIG. 4 is a diagram showing a detailed configuration of control device 200.

Referring to FIG. 4 together with FIG. 1, control device 200 includes an analysis control unit 210, a data processing unit 220, and a data generator 230. In this embodiment, analysis control unit 210, data processing unit 220, and data generator 230 are embodied by execution by processor 201 (FIG. 1), of a program stored in storage 203. Without being limited as such, each of these units may be embodied by dedicated hardware (electronic circuitry).

Analysis control unit 210 is configured to control analysis apparatus 100. Data processing unit 220 generates a signal indicating a state of analysis apparatus 100 based on outputs from various sensors (including detector 130) provided in analysis apparatus 100 and outputs the generated signal to analysis control unit 210. Analysis control unit 210 controls analysis apparatus 100 based on the signal received from data processing unit 220 to have sample M analyzed. Infrared coherent light representing characteristics of sample M is thus detected by detector 130.

Data processing unit 220 subjects a detection signal inputted from detector 130 to A/D conversion and has the resultant digital detection signal recorded in storage 203. An interferogram is thus recorded in storage 203. When recording of the interferogram is completed, data processing unit 220 notifies data generator 230 to that effect. Data generator 230 generates an FT-IR spectrum by Fourier transform of the interferogram caused to be recorded by data processing unit 220.

In obtaining an FT-IR spectrum for qualitative analysis of a compound having an unknown molecular structure (which is also referred to as an "unknown compound" below), the user sets the unknown compound in analysis apparatus 100 as sample M. The set unknown compound is analyzed by analysis apparatus 100. As a result of this analysis, an interferogram is recorded in storage 203. Data generator 230 generates an FT-IR spectrum of the unknown compound based on that interferogram, and has the FT-IR spectrum stored in storage 203. This FT-IR spectrum is stored in storage 203 as being distinguished from training data which will be described later.

The FT-IR spectrum of the unknown compound obtained as above is analyzed by a data analysis apparatus 500 (see FIG. 13) which will be described later. Though details will be described later, the user can pass data in storage 203 to data analysis apparatus 500 with the use of a portable storage medium 600 (for example, a memory card, a memory stick, or a memory disc). Control device 200 is configured such that storage medium 600 can be attached thereto and removed therefrom and configured to communicate data with attached storage medium 600. The user can copy or move FT-IR spectrum data in storage 203 to storage medium 600 by operating control device 200 with a not-shown input apparatus.

In obtaining data to be used for machine learning (which is also referred to as "training data" below) by analysis of a compound a molecular structure of which has already been known (which is also referred to as an "already known compound" below), the user sets the already known compound in analysis apparatus 100 as sample M. The set already known compound is analyzed by analysis apparatus 100. As a result of this analysis, an interferogram is recorded in storage 203. Data generator 230 generates an FT-IR spectrum of the already known compound based on that interferogram. Data generator 230 generates training data based on the obtained FT-IR spectrum and has the training data stored in storage 203. The training data according to this embodiment will be described in detail below.

In this embodiment, server 300 carries out machine learning (for example, supervised learning). Server 300 is configured to communicate with control device 200 and obtains training data from control device 200 through communication. Without being limited as such, the user can also transfer training data from control device 200 to server 300 with the use of storage medium 600 described previously.

Server 300 carries out machine learning for generating a trained model capable of analyzing whether or not an FT-IR spectrum includes a peak derived from a prescribed atomic group (which is also referred to as a "subject atomic group" below), with the use of the training data obtained from control device 200 as training data. In this embodiment, labeled data (data with ground truth) is adopted as training data. Though the subject atomic group may include any number of atomic groups, the subject atomic group includes at least one atomic group containing at least three atoms. In this embodiment, atomic groups Nos. 1 to 19 (see FIG. 8) which will be described later are defined as the subject atomic groups. Prior to training, for example, the user sets the subject atomic group in data generator 230.

Prior to the analysis by analysis apparatus 100, data generator 230 obtains sample information (that is, information on sample M). For example, the sample information inputted by the user through a not-shown input apparatus is inputted to data generator 230. Alternatively, sample information read by a not-shown reader from a tag attached to a container of sample M may be inputted to data generator 230. Data generator 230 generates the FT-IR spectrum of the already known compound based on the interferogram recorded in storage 203 as a result of the analysis and has the FT-IR spectrum stored in storage 203. At this time, data generator 230 has the FT-IR spectrum stored in association with atomic group information of sample M. In this embodiment, a step of generating an FT-IR spectrum of an already known compound and a step of storing the generated FT-IR spectrum in storage 203 in association with atomic group information of sample M correspond to an exemplary "analysis step" and an exemplary "storage step" in the method of generating a trained model according to the present disclosure, respectively.

When sample M (the already known compound) includes at least one of subject atomic groups, atomic group information of sample M indicates which subject atomic group is included in sample M. The atomic group information may indicate a subject atomic group with an atomic group number. For example, when sample M includes atomic group No. 3 (FIG. 8), contents of the atomic group information may be represented as "3", and when sample M includes atomic group No. 7 and atomic group No. 16 (FIG. 8), contents of the atomic group information may be represented as "7, 16". When sample M includes no subject atomic group, on the other hand, the atomic group information of sample M indicates that sample M does not include the subject atomic group. The atomic group information may indicate that sample M does not include the subject atomic group with a number (for example, "0") other than the atomic group number.

In this embodiment, the sample information described above includes a name of a compound in sample M. Data generator 230 obtains the atomic group information of sample M based on the name of the compound in sample M. Data generator 230 is configured to communicate with a compound database (DB) 400. Compound DB 400 holds information on various compounds such that the information can be searched for. Data generator 230 can obtain the atomic group information of sample M by accessing compound DB 400 and searching the compound DB based on the name of the compound in sample M. Data generator 230 is configured to convert the name of the compound indicated in the sample information to a name in accordance with nomenclature adopted by compound DB 400. Therefore, even when the sample information indicates the name of the compound in accordance with the nomenclature different from that of compound DB 400, data generator 230 can convert the name of the compound in conformity with compound DB 400 and can conduct search above. A method of obtaining the atomic group information performed by data generator 230 is not limited as above. For example, the atomic group information may be included in the sample information inputted to data generator 230.

Figure 5:
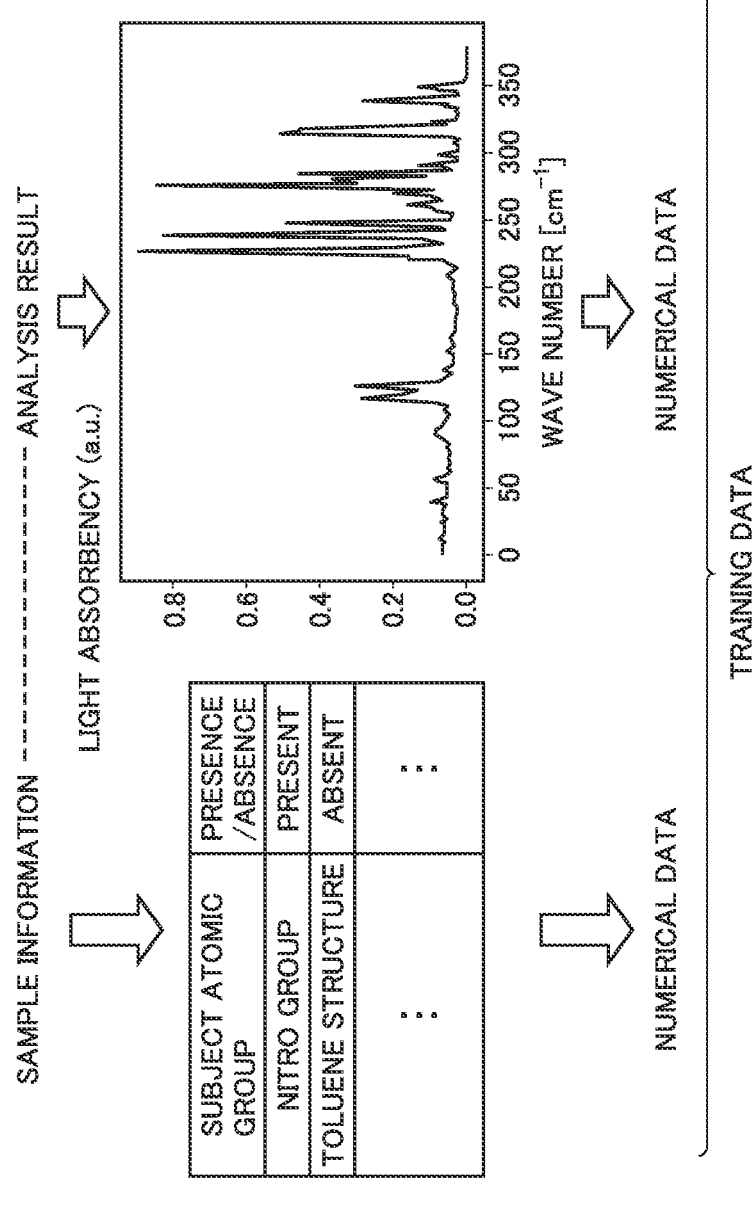
FIG. 5 is a diagram showing exemplary training data in a method of generating a trained model according to the embodiment of the present disclosure.

The training data is, for example, a pair of pieces of data which are input data and ground truth data, the input data being the FT-IR spectrum which is a result of measurement of a substance, an atomic group contained in which has already been known, the ground truth data representing presence or absence of the contained atomic group. An already existing compound DB is used here. FIG. 5 is a diagram showing exemplary training data. Referring to FIG. 5, training data includes an FT-IR spectrum and atomic group information. The atomic group information indicating presence or absence of each subject atomic group is obtained, for example, from sample information. In this embodiment, data converted to numerical values as described previously is adopted as the atomic group information. The FT-IR spectrum is obtained as a result of analysis by analysis apparatus 100. In this embodiment, the FT-IR spectrum is also converted to numerical values. The FT-IR spectrum included in the training data may be data representing a light absorbency for each wave number as a numerical value. For example, the light absorbency may be expressed as "0.15, 0.18, 0.25, . . . " at prescribed intervals (for example, 4 cm-1 intervals) within a prescribed wave number range. In this embodiment, numerical data of each of the FT-IR spectrum and the atomic group information is adopted as training data as above.

Figure 6:
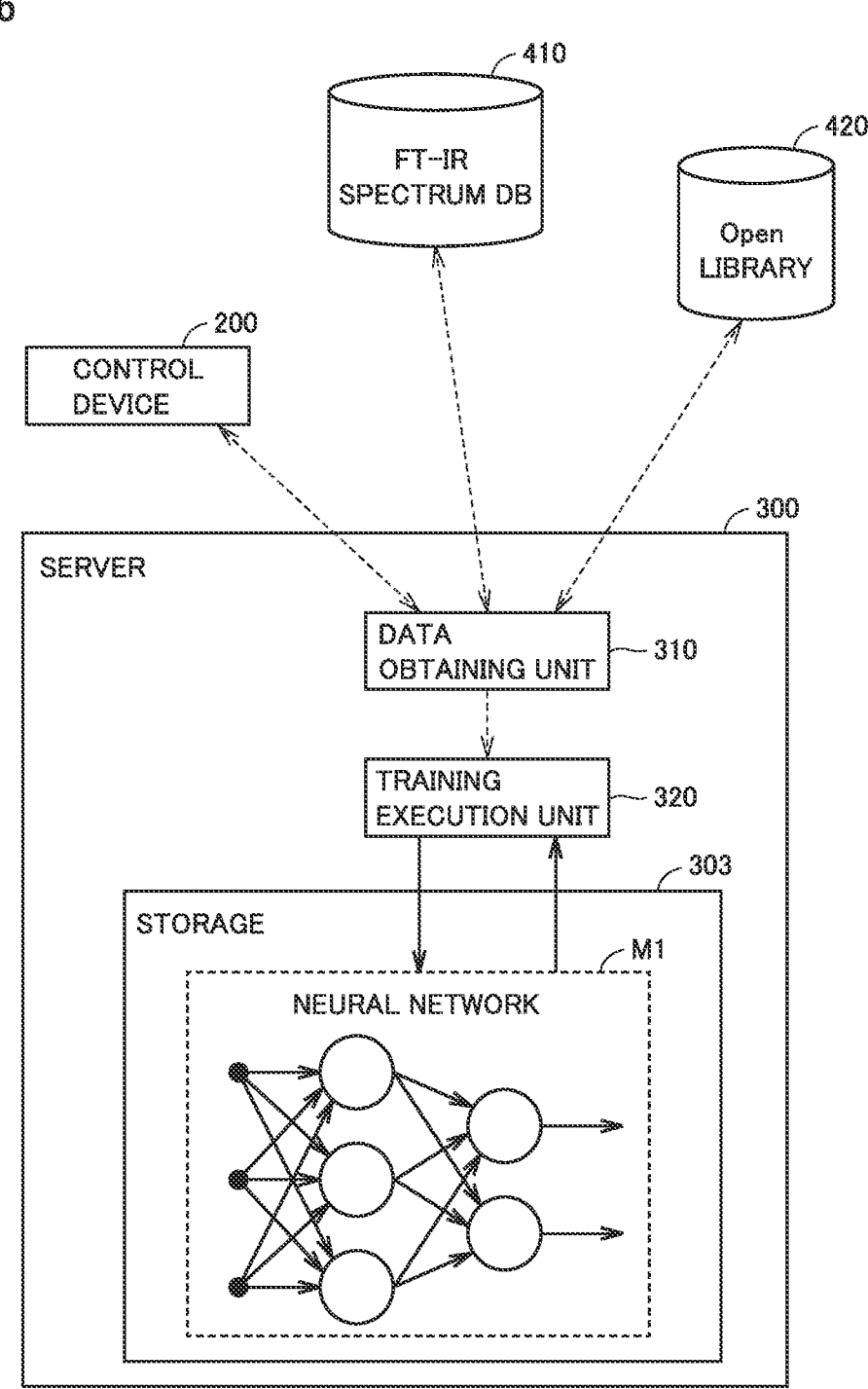
FIG. 6 is a diagram showing a detailed configuration of a server shown in FIG. 4.

FIG. 6 is a diagram showing a detailed configuration of server 300. Referring to FIG. 6 together with FIG. 4, in this embodiment, a computer (FIG. 4) including a processor 301, a RAM 302, a storage 303, and a communication apparatus 304 is adopted as server 300. Server 300 includes a data obtaining unit 310 and a training execution unit 320. In this embodiment, data obtaining unit 310 and training execution unit 320 are embodied by execution by processor 301, of a program stored in storage 303. Without being limited as such, each of these units may be embodied by dedicated hardware (electronic circuitry).

Data obtaining unit 310 obtains training data from control device 200. Data obtaining unit 310 is configured to communicate with each of an FT-IR spectrum database (DB) 410 and an Open library 420. Each of FT-IR spectrum DB 410 and Open library 420 holds an FT-IR spectrum for each compound. Data obtaining unit 310 converts data obtained from each of FT-IR spectrum DB 410 and Open library 420 into a data format identical to that of the training data (see FIG. 5) described previously.

Before training, an untrained mathematical model M1 (for example, a neural network) is stored in storage 303. The neural network is a mathematical model that simulates a mechanism of a brain neural network. Training execution unit 320 carries out machine learning of mathematical model M1 with the use of the training data obtained by data obtaining unit 310. A trained model M2 as shown, for example, in FIG. 7 is thus generated. As a result of the machine learning, the subject atomic group described previously is trained. In other words, the subject atomic group becomes a trained atomic group in trained model M2. In this embodiment, a step of machine learning of mathematical model M1 corresponds to an exemplary "training step" in the method of generating a trained model according to the present disclosure.

FIG. 7 is a diagram for illustrating trained model M2. Referring to FIG. 7, when trained model M2 receives input of an FT-IR spectrum and designation information (for example, a name of the atomic group) that designates one atomic group (for example, any one of atomic groups Nos. 1 to 19 shown in FIG. 8) included in trained atomic groups, trained model M2 outputs information indicating whether or not the inputted FT-IR spectrum (which is also referred to as an "input spectrum" below) includes a peak derived from the atomic group designated by the inputted designation information (which is also referred to as a "designated atomic group" below). In other words, trained model M2 functions as a classifier. Information outputted from trained model M2 is also referred to as a "model analysis result" below. An input spectrum including a peak derived from the designated atomic group is also referred to as "with atomic group" and the input spectrum not including a peak derived from the designated atomic group is also referred to as "without atomic group." Trained model M2 may output as a model analysis result, "1" in the case of with atomic group and "0" in the case of without atomic group.

The inventors of the present application actually generated trained model M2 and evaluated accuracy of classification by generated trained model M2. A convolutional neural network (CNN) including a convolution layer, a pooling layer, and a dense layer was employed as untrained mathematical model M1. Specifically, the CNN in which three convolution layers and one pooling layer were alternately layered twice and thereafter two dense layers fully connected the layers was adopted. The ReLU function was adopted as an activation function, and a softmax function was adopted as an output layer (final activation). Trained model M2 was generated by machine learning (more specifically, deep learning) based on back propagation, by mathematical model M1 with the use of a data set including 5276 pieces of training data. The number of epochs indicating the number of times of learning was set to thirty.

Atomic groups Nos. 1 to 19 shown in FIG. 8 were defined as subject atomic groups (trained atomic groups). The subject atomic groups (trained atomic groups) included an atomic group including less than three atoms (which is also referred to as a "small atomic group" below) and an atomic group containing at least three atoms (which is also referred to as a "large atomic group" below). Specifically, atomic groups Nos. 1 to 7 fall under the small atomic group and atomic groups Nos. 8 to 19 fall under the large atomic group. Atomic groups Nos. 1 to 7 were a fluoro group, a chloro group, a bromo group, an iodo group, a hydroxy group, an amino group, and a cyano group, respectively. Atomic groups Nos. 8 to 19 were a nitro group, an ester group, an acrylic acid structure, a toluene structure, a thiophene structure, a pyrimidine structure, a toluidine structure (more specifically, an o-toluidine structure), an benzoic acid structure (a kind of an aromatic carboxylic acid structure), a benzamide structure, a salicylic acid structure, a benzimidazole structure, and a benzothiazole structure, respectively. Each of atomic groups Nos. 11 and 14 to 19 is an atomic group containing a carbocycle and each of atomic groups Nos. 12, 13, 18, and 19 is an atomic group containing a heterocycle.

The inventors of the present application prepared approximately five hundred pieces of validation data and evaluated trained model M2 generated as above with the use of the validation data. The inventors of the present application evaluated accuracy of correct determination by trained model M2 as with atomic group (positive)/without atomic group (negative), with the designated atomic group for trained model M2 being varied. The inventors of the present application obtained a receiver operating characteristic (ROC) curve and calculated an area under the curve (AUC) from the ROC curve. The ROC curve refers to a line obtained by plotting results of determination, with a threshold value (cut-off point) being varied, on a plane where the ordinate represents a true positive rate (TPR) and the abscissa represents a false positive rate (FPR), and connecting pieces of plotted data. The AUC corresponds to an area under the ROC curve and takes a value from 0 to 1. A classifier higher in AUC means higher accuracy of classification.

The AUC was calculated for each trained atomic group. FIG. 8 is a diagram showing an average AUC (that is, an average value of all evaluation results) of each trained atomic group of trained model M2. Referring to FIG. 8, the AUC equal to or larger than 0.900 was obtained for the large atomic group (atomic groups Nos. 8 to 19). The small atomic group (atomic groups Nos. 1 to 7) was lower in AUC than the large atomic group.

Figure 9:
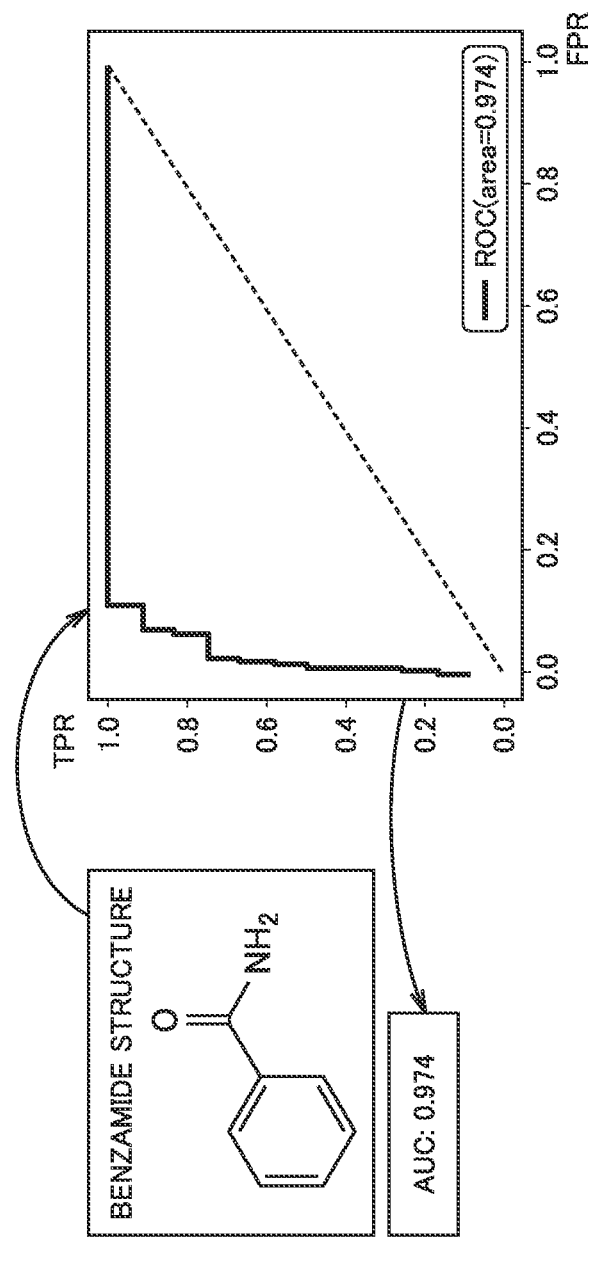
FIG. 9 is a diagram showing an exemplary result of evaluation of the trained model when a benzamide structure is adopted as the designated atomic group.
Figure 10:
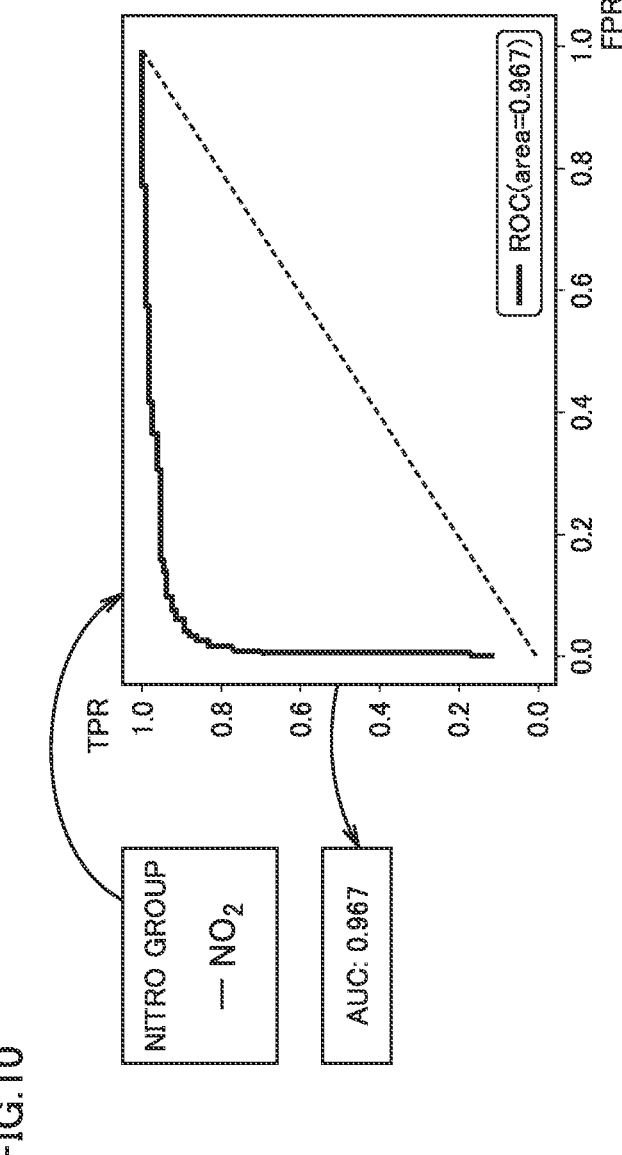
FIG. 10 is a diagram showing an exemplary result of evaluation of the trained model when a nitro group is adopted as the designated atomic group.
Figure 11:
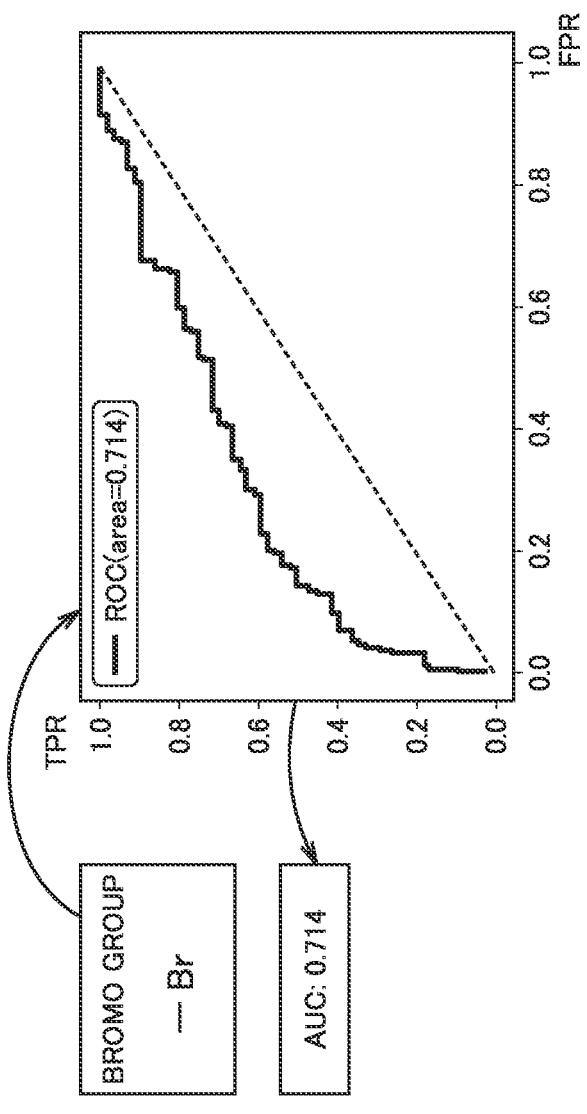
FIG. 11 is a diagram showing an exemplary result of evaluation of the trained model when a bromo group is adopted as the designated atomic group.

FIG. 9 is a diagram showing an exemplary result of evaluation of trained model M2 when atomic group No. 16 (benzamide structure) is adopted as the designated atomic group. FIG. 10 is a diagram showing an exemplary result of evaluation of trained model M2 when atomic group No. 8 (nitro group) is adopted as the designated atomic group. FIG. 11 is a diagram showing an exemplary result of evaluation of trained model M2 when atomic group No. 3 (bromo group) is adopted as the designated atomic group. As shown in FIGS. 9 and 10, for the benzamide structure and the nitro group that fall under the large atomic group, the ROC curve in which the TPR increased to a value close to one while the FPR was low was drawn and the high AUC was obtained. For the bromo group that falls under the small atomic group, on the other hand, as shown in FIG. 11, the ROC curve that gently rises was drawn and the AUC was low.

Figure 12:
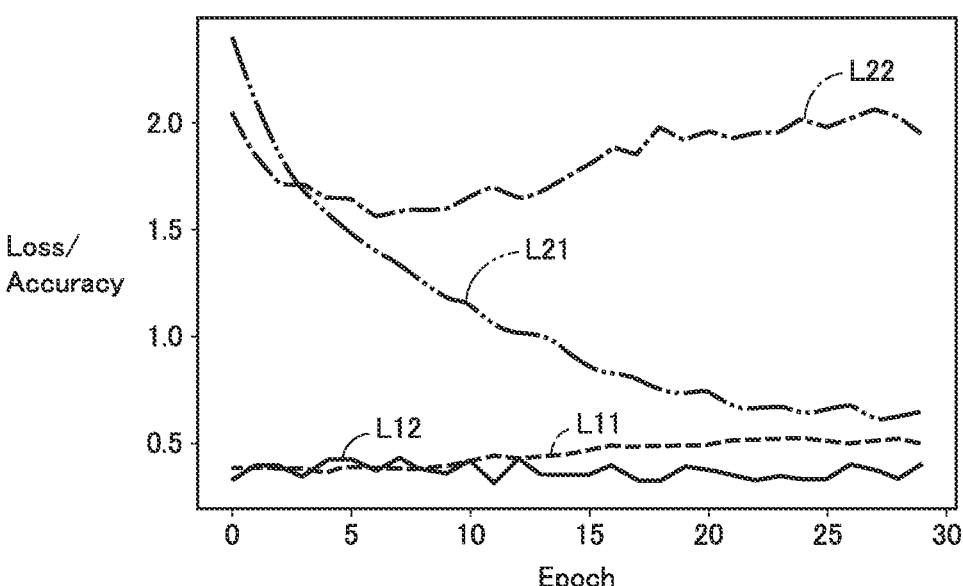
FIG. 12 is a diagram showing exemplary transition of each of a value of a loss function and an accuracy of classification in the method of generating a trained model according to the embodiment of the present disclosure.

FIG. 12 is a diagram showing transition of each of a value of a loss function and an accuracy of classification in machine learning of mathematical model M1. In FIG. 12, a line L11 represents train accuracy of classification of training data and a line L12 represents validation accuracy of classification of validation data. A line L21 represents a value of a loss function (train loss) of training data and a line L22 represents a value of a loss function (validation loss) of validation data. Referring to FIG. 12, as shown in this graph, in generation of trained model M2, training was carried out until values of the loss functions substantially converged.

Referring again to FIG. 7, in this embodiment, trained model M2 described above is incorporated in data analysis apparatus 500. In this embodiment, a computer including a processor 501, a RAM 502, a storage 503, and a communication apparatus 504 is adopted as data analysis apparatus 500. Trained model M2 is stored in storage 503.

Figure 13:
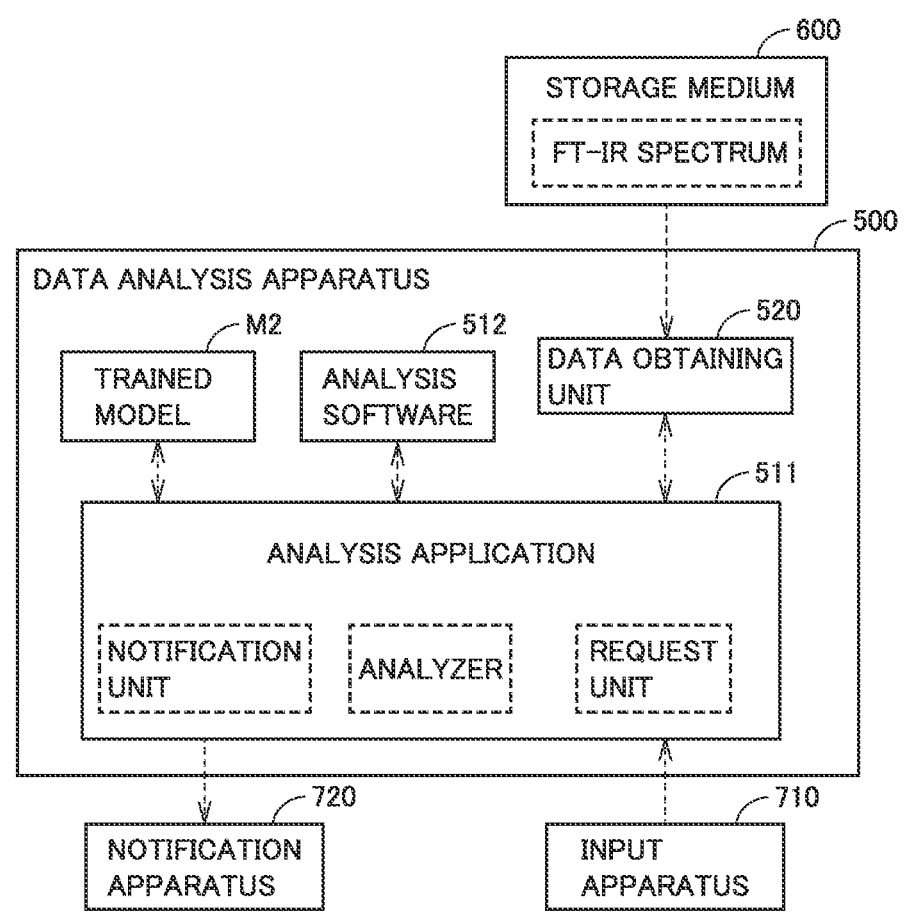
FIG. 13 is a diagram showing a detailed configuration of a data analysis apparatus shown in FIG. 7.

FIG. 13 is a diagram showing a detailed configuration of data analysis apparatus 500. Referring to FIG. 13 together with FIG. 7, data analysis apparatus 500 includes an analysis application 511, analysis software 512, and a data obtaining unit 520. Analysis application 511 and analysis software 512 are stored in storage 503 (FIG. 7) together with trained model M2. In this embodiment, data obtaining unit 520 is embodied by execution by processor 501 (FIG. 7), of a program stored in storage 503. Analysis application 511 is an application program, and functions as a "request unit," an "analyzer", and a "notification unit" according to the present disclosure. Each of these units is embodied by execution by processor 501 (FIG. 7), of analysis application 511 stored in storage 503. Each function embodied by software in this embodiment may be embodied by dedicated hardware (electronic circuitry).

Data analysis apparatus 500 is configured to exchange information with each of an input apparatus 710 and a notification apparatus 720. Input apparatus 710 is configured to receive input from a user. Input apparatus 710 outputs a signal corresponding to the input from the user to data analysis apparatus 500. Examples of input apparatus 710 include various pointing devices (a mouse, a touch pad, etc.), a keyboard, and a touch panel. Input apparatus 710 may include a smart speaker that receives audio input.

Notification apparatus 720 is configured to notify a user. Data analysis apparatus 500 can notify the user of information through notification apparatus 720. Examples of notification apparatus 720 include various displays. Notification apparatus 720 may perform a speaker function. In this embodiment, as input apparatus 710 and notification apparatus 720, a touch panel display that performs both of these functions is adopted. Input apparatus 710 and notification apparatus 720 may be mounted on a portable device (that is, an electronic device that can be carried by the user) such as a tablet terminal, a smartphone, or a wearable device.

Data analysis apparatus 500 is configured such that storage medium 600 is attachable thereto and removable therefrom and configured to communicate data with attached storage medium 600. Data analysis apparatus 500 can read data in attached storage medium 600. Data analysis apparatus 500 may include a reader, a drive, or a port for reading data in storage medium 600. The user obtains an analysis target which is the FT-IR spectrum, for example, in a procedure shown below to allow data analysis apparatus 500 to use the obtained analysis target.

The user analyzes an unknown compound with the FT-IR photometer shown in FIGS. 1 and 4 to obtain the FT-IR spectrum. The obtained FT-IR spectrum is stored in storage 203 (FIG. 4). The user copies FT-IR spectrum data in storage 203 to storage medium 600 and thereafter attaches storage medium 600 to data analysis apparatus 500. Data analysis apparatus 500 can thus read the FT-IR spectrum data in storage medium 600. In this embodiment, the FT-IR spectrum in storage medium 600 corresponds to the analysis target.

Analysis application 511 is configured to request the user to input a location (for example, a data path) where the analysis target (the FT-IR spectrum) is stored. As the user inputs the location where the analysis target is stored in storage medium 600 through input apparatus 710 in response to this request, data obtaining unit 520 obtains the analysis target from the storage location inputted by the user.

Analysis application 511 is configured to request the user to select at least one atomic group from among options including all trained atomic groups (in this embodiment, atomic groups Nos. 1 to 19 shown in FIG. 8). The user can select any atomic group from among the options through input apparatus 710. The atomic group selected by the user is inputted to analysis application 511.

Analysis application 511 is configured to obtain, for each atomic group selected by the user in response to the request, a result of analysis indicating whether or not a peak derived from the atomic group is included in the analysis target. Specifically, analysis application 511 obtains at least one of a model analysis result and a rule-based analysis result which will be described below.

When the atomic group selected by the user includes a large atomic group, analysis application 511 obtains with trained model M2, a result of analysis associated with the selected large atomic group. Analysis application 511 inputs an FT-IR spectrum (analysis target) designated by the user and designation information that designates the large atomic group (designated atomic group) selected by the user to trained model M2 to obtain the model analysis result.

When the atomic group selected by the user includes a small atomic group, analysis application 511 obtains with analysis software 512, a result of analysis associated with the selected small atomic group. Analysis software 512 is configured to analyze, when it is given an FT-IR spectrum, whether or not the given FT-IR spectrum includes a peak derived from a prescribed atomic group (which is also referred to as a "registered atomic group" below) on a rule basis. In this embodiment, the registered atomic group includes atomic groups Nos. 1 to 7 shown in FIG. 8. Analysis application 511 inputs to analysis software 512, the FT-IR spectrum (analysis target) designated by the user and information indicating the small atomic group (more specifically, any one of atomic groups Nos. 1 to 7 shown in FIG. 8) selected by the user. Analysis software 512 thus analyzes the FT-IR spectrum on the rule basis. Information (which is also referred to as a "rule-based analysis result" below) indicating whether or not the analysis target includes the peak derived from the small atomic group (that is, the registered atomic group indicated by the inputted information) is obtained as the result of analysis by analysis software 512. Analysis of the FT-IR spectrum on the rule basis is conducted, for example, in a procedure in accordance with the procedure shown in FIG. 3.

Analysis application 511 controls notification apparatus 720 to have notification apparatus 720 notify the user. When analysis application 511 obtains the result of analysis, it notifies the user of the result of analysis (that is, the model analysis result and/or the rule-based analysis result) through notification apparatus 720.

Figure 14:
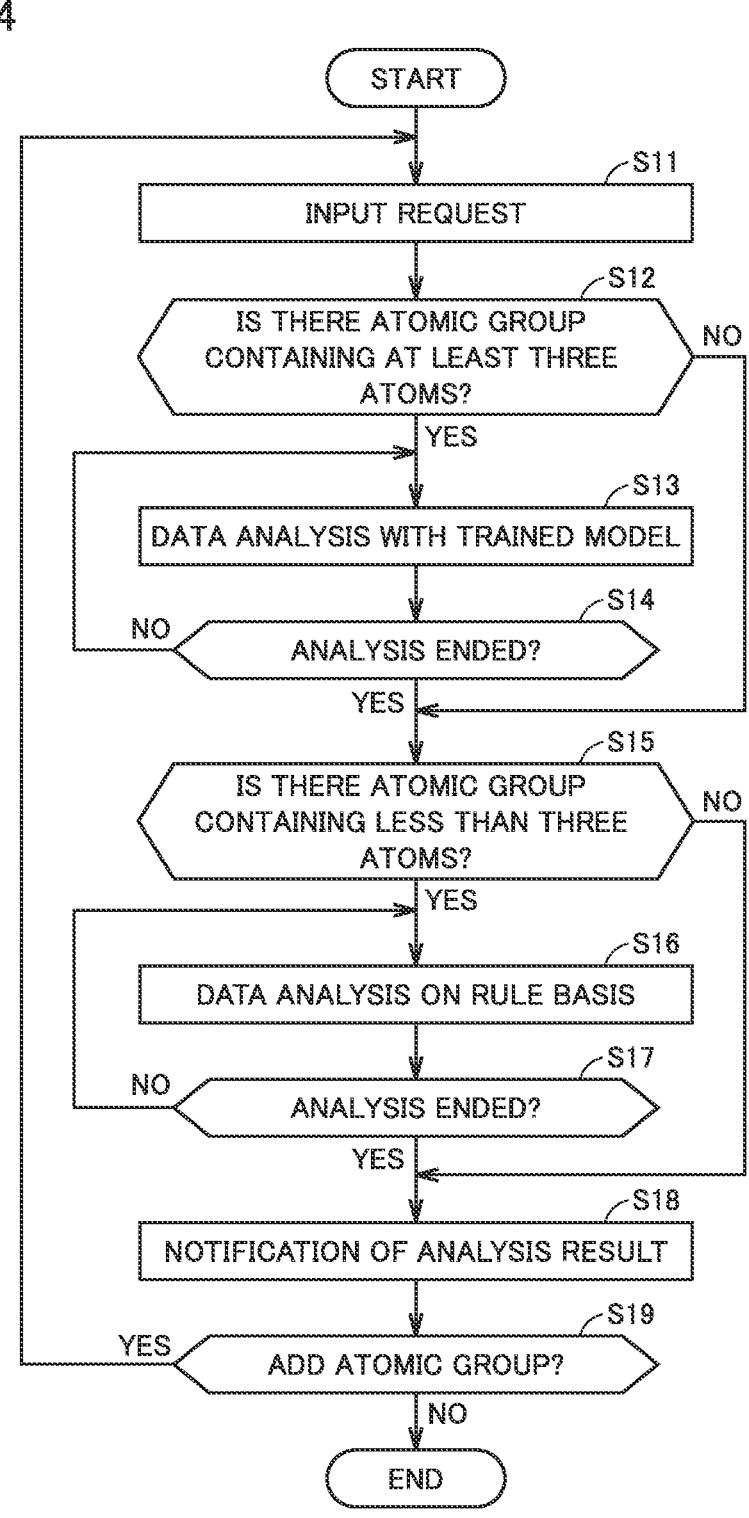
FIG. 14 is a flowchart showing a data analysis method according to the embodiment of the present disclosure.

FIG. 14 is a flowchart showing data analysis processing performed by data analysis apparatus 500 according to this embodiment. Processing shown in this flowchart is started, for example, when analysis application 511 is started up. The user can start up analysis application 511 by operating input apparatus 710.

Referring to FIG. 14 together with FIG. 13, in a step (which is also simply denoted as "S" below) 11, analysis application 511 requests the user to input the location where the analysis target (FT-IR spectrum) is stored and to input the atomic group. Initially, analysis application 511 has notification apparatus 720 show a first input screen which will be described below.

Figure 15:
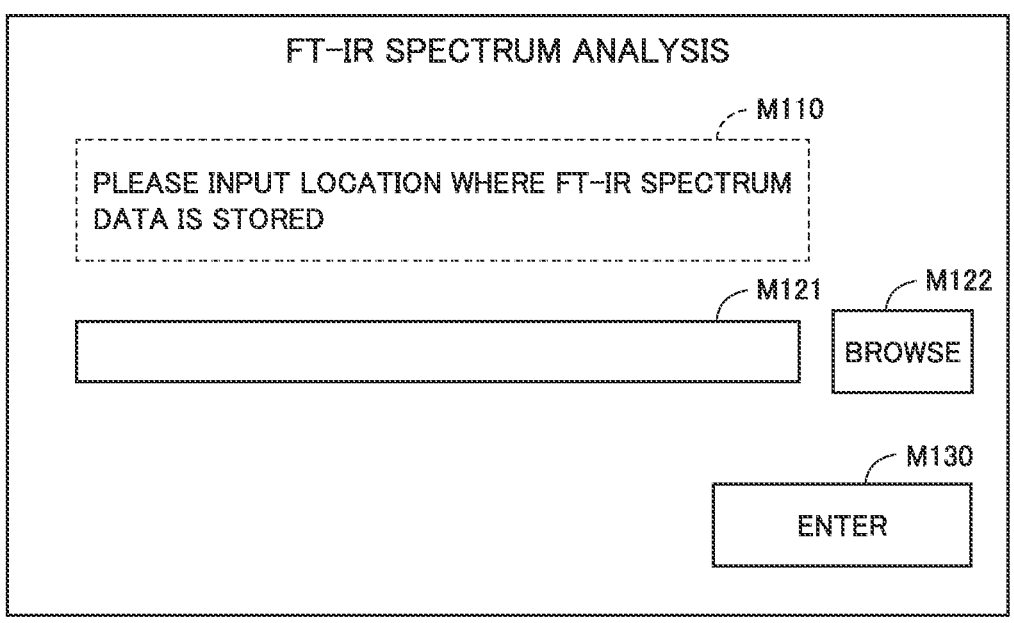
FIG. 15 is a diagram showing an exemplary screen for receiving input of a location where an FT-IR spectrum is stored in processing shown in FIG. 14.

FIG. 15 is a diagram showing an exemplary screen (that is, the first input screen) for receiving input by the user, of the location where the analysis target is stored. Referring to FIG. 15, the first input screen shows a message M110, a text box M121, a button M122 for showing a file selection dialog, and an enter button M130. Notification apparatus 720 is implemented as the touch panel display. Therefore, when a user's finger or a pen touches the screen, notification apparatus 720 can sense the touched position on the screen. The user can operate the screen by touching the screen.

Message M110 requests the user to input the location where the FT-IR spectrum (analysis target) is stored. The user can use a not-shown screen keyboard (virtual keyboard) to directly input the location (for example, a data path) where the FT-IR spectrum is stored into text box M121. As the user presses button M122, the file selection dialog is shown. The user can also use the file selection dialog to select FT-IR spectrum data (file). As the FT-IR spectrum data (file) is selected in the file selection dialog, the location where the FT-IR spectrum is stored is sent back to text box M121. As the user presses enter button M130 while the location where the FT-IR spectrum is stored is shown in text box M121, data obtaining unit 520 obtains the FT-IR spectrum from the storage location inputted by the user. In this embodiment, the step of obtaining the FT-IR spectrum performed by data obtaining unit 520 corresponds to an exemplary "obtaining step" in the data analysis method according to the present disclosure. Thereafter, analysis application 511 has notification apparatus 720 show a second input screen which will be described below.

Figure 16:
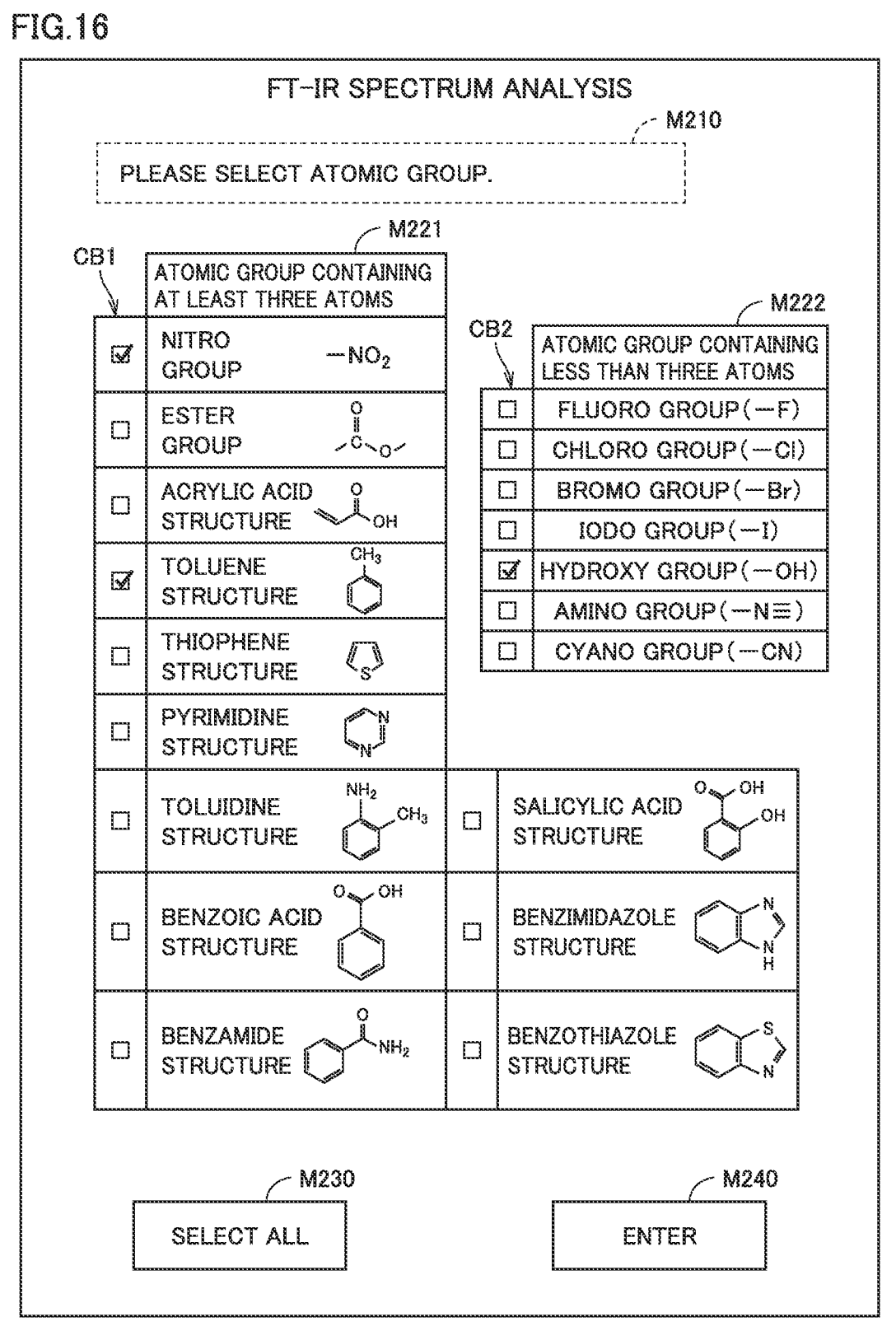

FIG. 16 is a diagram showing an exemplary screen (that is, the second input screen) for receiving input of an atomic group by the user. Referring to FIG. 16, the second input screen shows a message M210, a checkbox CB1 for selection of a large atomic group from among options, a legend field M221 for each checkbox CB1, a checkbox CB2 for selection of a small atomic group from among options, a legend field M222 for each checkbox CB2, an all-select button M230, and an enter button M240.

Message M210 requests the user to select an atomic group. The user can select a large atomic group shown in legend field M221 with the use of checkbox CB1. The user can select a small atomic group shown in legend field M222 with the use of checkbox CB2. The user can select all options by pressing all-select button M230. As the user presses enter button M240 while at least one atomic group has been selected from among options (in this embodiment, atomic groups Nos. 1 to 19 shown in FIG. 8) shown in legend fields M221 and M222, the process proceeds to S12 in FIG. 14. In an example shown in FIG. 16, the hydroxy group, the nitro group, and the toluene structure are selected.

Referring again to FIG. 14 together with FIG. 13, in S12, analysis application 511 determines whether or not the atomic group selected by the user in S11 includes a large atomic group. When the atomic group selected by the user includes the large atomic group (YES in S12), in S13, analysis application 511 inputs the FT-IR spectrum (analysis target) designated by the user in S11 and designation information that designates any one (designated atomic group) of large atomic groups selected by the user in S11 to trained model M2 to obtain the model analysis result. S13 according to this embodiment corresponds to an exemplary "input step" in the data analysis method according to the present disclosure. Thereafter, in S14, analysis application 511 determines whether or not analysis of the FT-IR spectrum for all large atomic groups selected by the user has ended.

When at least two large atomic groups are selected in S11, FT-IR spectra are sequentially analyzed for each large atomic group. When there is a large atomic group yet to be analyzed in spite of selection by the user, determination as NO is made in S14 and the process returns to S13. In S13, analysis application 511 changes the designated atomic group to the large atomic group yet to be analyzed, and analyzes again the FT-IR spectrum (analysis target) with trained model M2. Processing in S13 is performed as many times as the number of large atomic groups selected by the user in S11. When analysis of the FT-IR spectrum ends for all large atomic groups selected by the user (YES in S14), the process proceeds to S15. When the atomic group selected by the user does not include a large atomic group (NO in S12), on the other hand, the process proceeds to S15 without processing in S13 and S14 being performed.

In S15, analysis application 511 determines whether or not the atomic group selected by the user in S11 includes a small atomic group. When the atomic group selected by the user includes a small atomic group (YES in S15), in S16, analysis application 511 inputs the FT-IR spectrum (analysis target) designated by the user in S11 and information indicating any one of small atomic groups (registered atomic groups) selected by the user in S11 to analysis software 512 to obtain the rule-based analysis result. Thereafter, in S17, analysis application 511 determines whether or not analysis of the FT-IR spectrum has ended for all small atomic groups selected by the user.

When at least two small atomic groups are selected in S11, FT-IR spectra are sequentially analyzed for each small atomic group. When there is a small atomic group yet to be analyzed in spite of selection by the user, determination as NO is made in S17 and the process returns to S16. Analysis application 511 inputs the small atomic group (registered atomic group) yet to be analyzed in S16 to analysis software 512 and analyzes again the FT-IR spectrum (analysis target) with analysis software 512. Processing in S16 is performed as many times as the number of small atomic groups selected by the user in S11. When analysis of the FT-IR spectrum ends for all small atomic groups selected by the user (YES in S17), the process proceeds to S18. When the atomic group selected by the user does not include a small atomic group (NO in S15), the process proceeds to S18 without processing in S16 and S17 being performed.

In S18, analysis application 511 controls notification apparatus 720 to notify the user of the result of analysis (that is, the model analysis result and/or the rule-based analysis result) obtained in at least one of S13 and S16. Analysis application 511 has notification apparatus 720 show, for example, a notification screen which will be described below.

Figure 17:
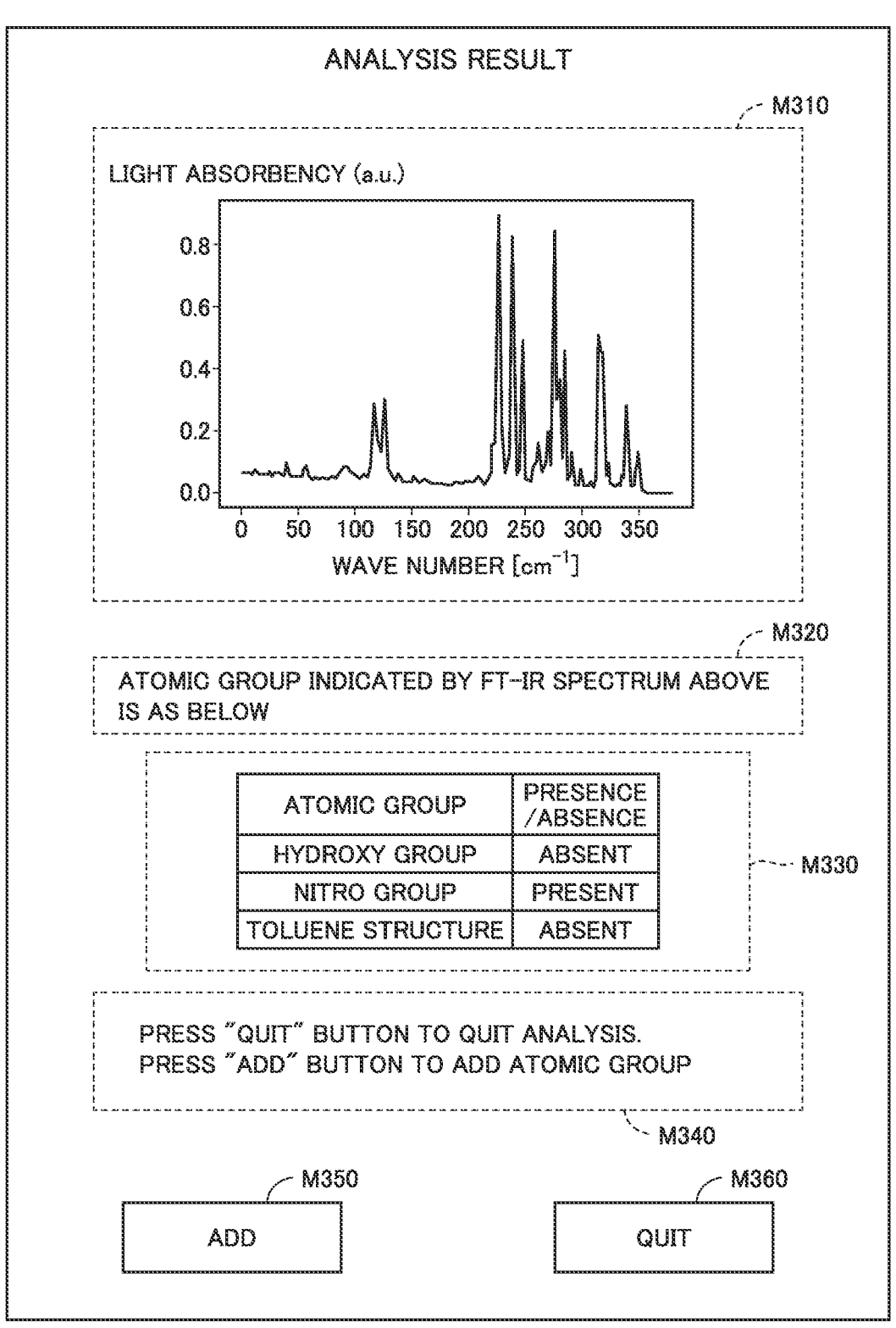
FIG. 17 is a diagram showing an exemplary screen for notifying a user of a result of analysis in the processing shown in FIG. 14.

FIG. 17 is a diagram showing an exemplary screen (that is, the notification screen) for notifying the user of the result of analysis. Referring to FIG. 17, the notification screen includes a representation section M310, messages M320 and M340, an analysis result M330, an add button M350, and a quit button M360.

Representation section M310 shows the analysis target which is the FT-IR spectrum. Message M320 shows explanation about analysis result M330. Analysis result M330 shows for each atomic group selected by the user in S11 in FIG. 14, the result of analysis indicating whether or not a peak derived from the atomic group is included in the analysis target. An example shown in FIG. 17 shows a result of analysis when the user selects the hydroxy group, the nitro group, and the toluene structure. Message M340 shows explanation about add button M350 and quit button M360. As the user presses any one of add button M350 and quit button M360, the process proceeds to S19 in FIG. 14.

Referring to FIG. 14 together with FIG. 17, in S19, analysis application 511 determines whether or not the user desires addition of the atomic group. When add button M350 is pressed in the notification screen (FIG. 17) described previously, the user is determined as desiring addition of the atomic group (YES in S19) and the process returns to S11. When quit button M360 is pressed in the notification screen (FIG. 17) described previously, the user is determined as not desiring addition of the atomic group (NO in S19) and a series of processing shown in FIG. 14 ends.

[Modification]

Though all of trained atomic groups are included in options (see FIG. 16) selectable by the user in the embodiment, the options may include only some of trained atomic groups.

The atomic group to be machine-trained (subject atomic group) is not limited to the atomic groups shown in FIG. 8 but can be modified as appropriate. For example, instead of or in addition to the o-toluidine structure, an isomer thereof (an m-toluidine structure or a p-toluidine structure) may be adopted. Instead of or in addition to the benzoic acid structure, another aromatic carboxylic acid structure (a phthalic acid structure, an isophthalic acid structure, or a terephthalic acid structure) may be adopted. Though the small atomic group is included in the subject atomic group (trained atomic group) in order to compare results of evaluation between the small atomic group and the large atomic group associated with trained model M2 in the embodiment, the subject atomic group (trained atomic group) may include only the large atomic group.

The embodiment is configured such that the options (see FIG. 16) selectable by the user include the small atomic group (atomic groups Nos. 1 to 7 shown in FIG. 8) included in the registered atomic group and the large atomic group (atomic groups Nos. 8 to 19 shown in FIG. 8) included in the trained atomic group and analysis application 511 obtains the result of analysis with analysis software 512 for the selected small atomic group and obtains the result of analysis with trained model M2 for the selected large atomic group. Data analysis apparatus 500 being provided with analysis software 512, however, is not essential. For example, in S16 in FIG. 14, the user may visually analyze data without using analysis software 512. Alternatively, options selectable by the user at the time when analysis application 511 requests the user to select an atomic group may be limited to the large atomic group. Analysis application 511 may be configured to obtain the result of analysis with trained model M2 for the selected large atomic group.

FIG. 18 is a diagram showing a modification of the screen shown in FIG. 16. Referring to FIG. 18, this screen is the same as the screen shown in FIG. 16 except for absence of checkbox CB2 for selecting a small atomic group and legend field M222 for each checkbox CB2.

Figure 19:
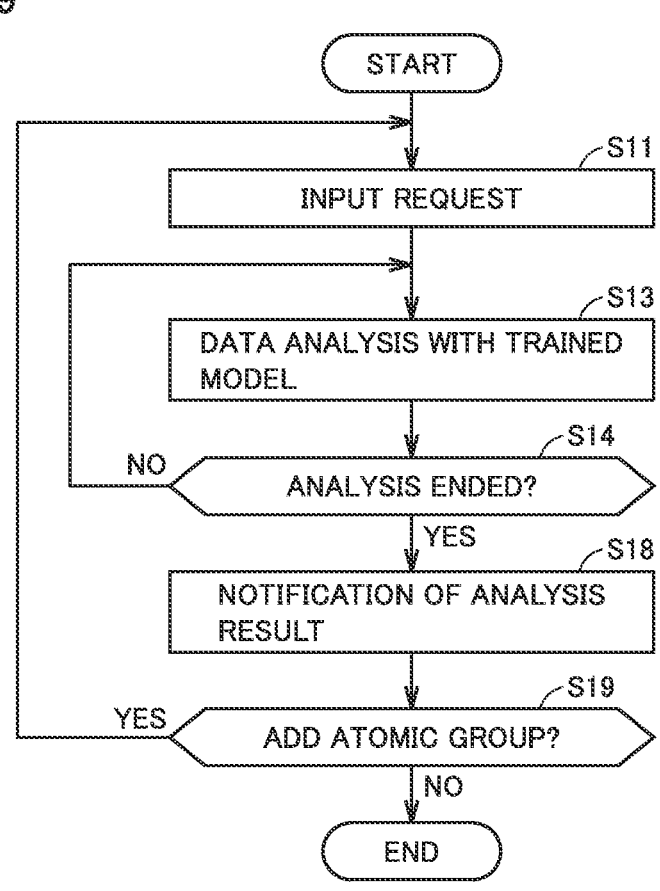
FIG. 19 is a diagram showing a modification of the processing shown in FIG. 14.

FIG. 19 is a diagram showing a modification of the processing shown in FIG. 14. In processing shown in FIGS. 19, S12 and S15 to S17 shown in FIG. 14 are not provided. In the processing shown in FIG. 19, in S11, the screen shown in FIG. 18 is adopted instead of the screen shown in FIG. 16. The atomic groups selectable by the user in S11 thus include no small atomic group. In S11, a large atomic group (for example, atomic groups Nos. 8 to 19 shown in FIG. 8) is always selected. S13, S14, S18, and S19 in FIG. 19 are the same as S13, S14, S18, and S19 in FIG. 14 described previously. In the processing shown in FIG. 19, analysis by analysis software 512 is not conducted. Therefore, data analysis apparatus 500 does not have to incorporate analysis software 512.

The method of machine learning is not limited to the method adopted in the embodiment but any method may be applicable. The trained model may be composed of a plurality of classifiers.

The configuration of the Fourier transform infrared spectrophotometer that obtains an FT-IR spectrum is not limited to the configuration shown in FIG. 1 and can be modified as appropriate. For example, in the configuration shown in FIG. 1, infrared coherent light reflected by sample M is detected. The configuration of Fourier transform infrared spectrophotometer, however, may be modified to detect infrared coherent light that has passed through sample M.

Server 300 and data analysis apparatus 500 may be mounted on the Fourier transform infrared spectrophotometer. Control device 200 may perform the functions of server 300 and data analysis apparatus 500.

Though the FT-IR spectrum where the abscissa represents a wave number and the ordinate represents an absorbance is illustrated, the abscissa in the FT-IR spectrum may represent a wavelength. The ordinate in the FT-IR spectrum may represent a transmittance.

[Aspects]

Illustrative embodiments and modifications thereof described above are understood by a person skilled in the art as specific examples of aspects below.

(Clause 1) A data analysis apparatus according to one aspect includes an obtaining unit that obtains an analysis target which is an FT-IR spectrum, a trained model, and an analyzer that provides the analysis target to the trained model. The trained model is machine-trained to output, when the trained model receives input of an FT-IR spectrum, information indicating whether the inputted FT-IR spectrum includes a peak derived from a trained atomic group. The trained atomic group includes an atomic group containing at least three atoms.

The data analysis apparatus described in Clause 1 can highly accurately and readily analyze the FT-IR spectrum of the atomic group containing at least three atoms with the use of the trained model. The inventors of the present application have successfully generated a trained model capable of highly accurately analyzing whether or not an FT-IR spectrum (an analysis target provided to the trained model) includes a peak derived from a trained atomic group (an atomic group containing at least three atoms), by machine learning in connection with the atomic group containing at least three atoms (see FIG. 8).

(Clause 2) In the data analysis apparatus described in Clause 1, the trained atomic group may include a plurality of atomic groups. The trained model may be configured to output, when the trained model receives input of an FT-IR spectrum and information designating one atomic group included in the trained model, information indicating whether the inputted FT-IR spectrum includes a peak derived from the atomic group designated by the inputted information.

According to the data analysis apparatus described in Clause 2, FT-IR spectra of a plurality of atomic groups can highly accurately and readily be analyzed.

(Clause 3) The data analysis apparatus described in Clause 1 or 2 may further include a request unit that requests a user to select at least one atomic group from among options including at least one atomic group of the trained atomic group and a notification unit that has a notification apparatus notify the user. The analyzer may be configured to obtain, for each of the at least one atomic group selected in response to the request, a result of analysis indicating whether the peak derived from the atomic group is included in the analysis target. The notification unit may be configured to notify the user of the result of analysis through the notification apparatus.

According to the data analysis apparatus described in Clause 3, the FT-IR spectrum can be analyzed for each atomic group selected by the user and the user can be notified of the result of analysis.

(Clause 4) The data analysis apparatus described in Clause 3 may further include analysis software that analyzes, when the analysis software is given an FT-IR spectrum, whether the given FT-IR spectrum includes a peak derived from a prescribed atomic group (registered atomic group) on a rule basis. The options may include an atomic group containing at least three atoms included in the trained atomic group and an atomic group containing less than three atoms included in the registered atomic group. The analyzer may be configured to obtain with the use of the trained model, when the atomic group containing at least three atoms is included in the at least one atomic group selected in response to the request, the result of analysis associated with the selected atomic group containing at least three atoms. The analyzer may be configured to obtain with the use of the analysis software, when the atomic group containing less than three atoms is included in the at least one atomic group selected in response to the request, the result of analysis associated with the selected atomic group containing less than three atoms.

The data analysis apparatus described in Clause 4 analyzes the FT-IR spectrum with the trained model and the analysis software. The trained model analyzes the FT-IR spectrum only for the atomic group containing at least three atoms. Since the trained model should be trained only for the atomic group containing at least three atoms, training load can be reduced.

(Clause 5) In the data analysis apparatus described in any one of Clauses 1 to 4, the trained atomic group may include at least one of an atomic group containing a carbocycle and an atomic group containing a heterocycle.

According to the configuration, the trained model capable of highly accurately analyzing the FT-IR spectrum can readily be obtained by machine learning.

(Clause 6) In the data analysis apparatus described in any one of Clauses 1 to 4, the trained atomic group may include at least one atomic group selected from the group consisting of a nitro group, an ester group, an acrylic acid structure, a toluene structure, a thiophene structure, a pyrimidine structure, a toluidine structure, an aromatic carboxylic acid structure, a benzamide structure, a salicylic acid structure, a benzimidazole structure, and a benzothiazole structure.

According to the configuration, the trained model capable of highly accurately analyzing the FT-IR spectrum can readily be obtained by machine learning.

(Clause 7) A data analysis method according to one aspect includes an obtaining step and an input step which will be described below.

In the obtaining step, an FT-IR spectrum of a compound having an unknown molecular structure is obtained. In the input step, the FT-IR spectrum obtained in the obtaining step and designation information that designates one atomic group composed of at least three atoms are inputted to a trained model. The trained model is a mathematical model machine-trained to output, when the trained model receives input of an FT-IR spectrum and the designation information, information indicating whether the inputted FT-IR spectrum includes a peak derived from an atomic group containing at least three atoms designated by the inputted designation information.

With the data analysis method described in Clause 7, the FT-IR spectrum of the atomic group containing at least three atoms can highly accurately and readily be analyzed with the use of the trained model.

(Clause 8) A method of generating a trained model according to one aspect includes an analysis step, a storage step, and a training step which will be described below.

In the analysis step, a compound having an already known molecular structure is analyzed with a Fourier transform infrared spectrophotometer to obtain an FT-IR spectrum. In the storage step, the FT-IR spectrum obtained in the analysis step and atomic group information of the compound analyzed in the analysis step are stored in association with each other. In the training step, machine learning for generating a trained model capable of analyzing whether an FT-IR spectrum includes a peak derived from a prescribed atomic group (subject atomic group) is carried out, with the FT-IR spectrum and the atomic group information stored in the storage step being used as training data. The subject atomic group includes an atomic group containing at least three atoms. The atomic group information of a compound including the subject atomic group indicates the subject atomic group included in the compound. The atomic group information of a compound not including the subject atomic group indicates that the compound does not include the subject atomic group.

According to the method of generating a trained model described in Clause 8, training data for machine learning can readily be obtained. In addition, a trained model capable of highly accurately analyzing the FT-IR spectrum can be generated by machine learning with obtained training data.

(Clause 9) A system according to one aspect is a system including at least one computer that performs the data analysis method described in Clause 7 or the method of generating a trained model described in Clause 8.

(Clause 10) A program according to one aspect is a program that causes a computer to perform the data analysis method described in Clause 7 or the method of generating a trained model described in Clause 8. The program may be stored in a non-transitory computer readable medium.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 100 analysis apparatus; 110 interference wave generator; 111 light source; 112 light concentration mirror; 113 collimator mirror; 114 beam splitter; 115 fixed mirror; 116 movable mirror; 117 mirror actuator; 120 emitter; 121, 123 light concentration mirror; 122 prism; 124 pressing mechanism; 130 detector; 200 control device; 201, 301, 501 processor; 202, 302, 502 RAM; 203, 303, 503 storage; 204, 304, 504 communication apparatus; 210 analysis control unit; 220 data processing unit; 230 data generator; 300 server; 310 data obtaining unit; 320 training execution unit; 400 compound DB; 410 FT-IR spectrum DB; 420 Open library; 500 data analysis apparatus; 511 analysis application; 512 analysis software; 520 data obtaining unit; 600 storage medium; 710 input apparatus; 720 notification apparatus; M1 mathematical model; M2 trained model

The invention claimed is:

1. A data analysis apparatus comprising:

a processor; and a storage having recorded thereon a trained model machine-trained to output, when the trained model receives input of an FT-IR spectrum and first information designating one atomic group included in a trained atomic group, second information indicating whether the inputted FT-IR spectrum includes a peak derived from the atomic group designated by the inputted first information, wherein the trained atomic group includes an atomic group containing at least three atoms, the processor is configured to request a user to select at least one atomic group from among options including the atomic group containing at least three atoms, determine whether the at least one atomic group selected by the user includes the atomic group containing at least three atoms, and based upon the determination that the at least one atomic group selected by the user includes the atomic group containing at least three atoms, input an analysis target which is the FT-IR spectrum and the first information that designates the atomic group containing at least three atoms selected by the user to the trained model to analyze the analysis target, and the processor is configured not to analyze the analysis target by the trained model when the processor determines the at least one atomic group selected by the user does not include the atomic group containing at least three atoms.

2. The data analysis apparatus according to claim 1, wherein the processor is configured to obtain, for each of the at least one atomic group selected in response to the request, a result of analysis indicating whether the peak derived from the atomic group is included in the analysis target, and control a notification apparatus to notify the user of the result of analysis.

3. The data analysis apparatus according to claim 2, the storage further having recorded thereon analysis software that analyzes, when the analysis software is given an FT-IR spectrum, whether the given FT-IR spectrum includes a peak derived from a prescribed atomic group on a rule basis, wherein the options further include an atomic group containing less than three atoms that is included in the prescribed atomic group but not included in the trained atomic group, and the processor is configured to obtain with the trained model, when the atomic group containing at least three atoms is included in the at least one atomic group selected in response to the request, the result of analysis associated with the selected atomic group containing at least three atoms, and obtain with the analysis software, when the atomic group containing less than three atoms is included in the at least one atomic group selected in response to the request, the result of analysis associated with the selected atomic group containing less than three atoms.

4. The data analysis apparatus according to claim 3, wherein the trained atomic group includes at least one atomic group selected from the group consisting of a nitro group, an ester group, an acrylic acid structure, a toluene structure, a thiophene structure, a pyrimidine structure, a toluidine structure, an aromatic carboxylic acid structure, a benzamide structure, a salicylic acid structure, a benzimidazole structure, and a benzothiazole structure, and the prescribed atomic group includes at least one atomic group selected from the group consisting of a fluoro group, a chloro group, a bromo group, an iodo group, a hydroxy group, an amino group, and a cyano group.

5. The data analysis apparatus according to claim 3, wherein the processor is configured to, in response to analysis of the analysis target being completed for all atomic group selected by the user, control the notification apparatus to display the analysis target and the result of analysis for each atomic group selected by the user, the result of analysis indicating whether a peak derived from the atomic group is included in the analysis target.

6. The data analysis apparatus according to claim 2, wherein the processor is configured to control the notification apparatus to display a first input screen for receiving input by the user, of a storage location where the analysis target is stored, obtain the analysis target from the storage location inputted by the user, and control the notification apparatus to display a second input screen for receiving input of the at least one atomic group among the options by the user, the second input screen showing a message that requests the user to select the at least one atomic group from among the options.

7. A data analysis method comprising:

obtaining an FT-IR spectrum of a compound having an unknown molecular structure;

requesting a user to select at least one atomic group from among options including the atomic group containing at least three atoms;

determining whether the selected at least one atomic group includes an atomic group containing at least three atoms; and based upon the determination that the selected at least one atomic group includes the atomic group containing at least three atoms, inputting the obtained FT-IR spectrum and designation information that designates the atomic group containing at least three atoms selected by the user to a trained model, wherein the trained model is a mathematical model machine-trained to output, when the trained model receives input of an FT-IR spectrum and the designation information that designates the atomic group containing at least three atoms, information indicating whether the inputted FT-IR spectrum includes a peak derived from an atomic group containing at least three atoms designated by the inputted designation information.

8. A system including at least one computer that performs the method according to claim 7.

9. A non-transitory computer readable medium storing a program, wherein the program causes a computer to perform the method according to claim 7.

10. A method of generating a trained model comprising:

analyzing, by a Fourier transform infrared spectropho-tometer including an analysis apparatus and a control device, a compound having an already known molecu-lar structure with a Fourier transform infrared spectro-photometer to obtain an FT-IR spectrum;

storing, by the control device, the obtained FT-IR spec-trum and atomic group information of the analyzed compound in association with each other; and carrying out, by a server configured to communicate with the control device, machine learning for generating a trained model capable of analyzing whether an FT-IR spectrum includes a peak derived from a prescribed atomic group, with the stored FT-IR spectrum and the stored atomic group information being used as training data, wherein the prescribed atomic group does not include an atomic group containing less than three atoms and includes an atomic group containing at least three atoms, and the atomic group information of a compound including the prescribed atomic group indicates the prescribed atomic group included in the compound, and the atomic group information of a compound not including the prescribed atomic group indicates that the compound does not include the prescribed atomic group.

*    *    *    *    *